(12) United States Patent
Abotabl et al.

(10) Patent No.: US 12,739,870 B2
(45) Date of Patent: Sep. 15, 2026

(54) ANCHOR AND COMPLEMENTARY BANDWIDTH PARTS FOR FULL-DUPLEX OPERATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Wanshi Chen, San Diego, CA (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 8 days.

(21) Appl. No.: 17/374,905

(22) Filed: Jul. 13, 2021

(65) Prior Publication Data

US 2022/0022209 A1 Jan. 20, 2022

Related U.S. Application Data

(60) Provisional application No. 63/051,817, filed on Jul. 14, 2020.

(51) Int. Cl.
*H04W 72/566* (2023.01)
*H04L 5/00* (2006.01)
(Continued)

(52) U.S. Cl.
CPC ......... *H04W 72/569* (2023.01); *H04L 5/0098* (2013.01); *H04L 5/16* (2013.01); *H04W 72/23* (2023.01); *H04W 72/51* (2023.01)

(58) Field of Classification Search
CPC ........... H04W 72/1242; H04W 72/048; H04L 5/0098; H04L 5/16
See application file for complete search history.

(56) References Cited

U.S. PATENT DOCUMENTS 9,137,804 B2 9/2015 Lin et al.
11,133,912 B2 9/2021 Lee et al.
(Continued)

FOREIGN PATENT DOCUMENTS

CN 110611957 A 12/2019
CN 111263446 A 6/2020
(Continued)

OTHER PUBLICATIONS

International Search Report and Written Opinion—PCT/US2021/041622—ISA/EPO—Jan. 17, 2022.
(Continued)

*Primary Examiner* — Kevin M Cunningham
(74) *Attorney, Agent, or Firm* — QUALCOMM Incorporated

(57) ABSTRACT

Aspects of the disclosure relate to managing bandwidth parts for wireless communication. A BWP, of a plurality of BWPs of a carrier bandwidth, is activated. One of a slot format or a signaling priority of the activated BWP is determined. A second BWP may be configured to be complementary to the activated BWP, based on the determined slot format or signaling priority, wherein the second BWP is designated as a new BWP for a user equipment (UE) when the activated BWP is deactivated. Other aspects, embodiments, and features are also claimed and described.

6 Claims, 18 Drawing Sheets

(51) Int. Cl.
*H04L 5/16* (2006.01)
*H04W 72/23* (2023.01)
*H04W 72/51* (2023.01)

(56) References Cited

U.S. PATENT DOCUMENTS

| | | | | |
|---|---|---|---|---|
| 2019/0289513 | A1* | 9/2019 | Jeon | H04L 5/0098 |
| 2020/0137737 | A1* | 4/2020 | Jo | H04L 5/001 |
| 2020/0404690 | A1* | 12/2020 | Lee | H04L 5/001 |
| 2021/0068086 | A1* | 3/2021 | Behravan | H04W 72/042 |
| 2021/0119745 | A1* | 4/2021 | Li | H04W 72/0453 |
| 2021/0184824 | A1* | 6/2021 | Kwak | H04L 5/0094 |
| 2022/0338222 | A1* | 10/2022 | Kim | H04W 72/1273 |

FOREIGN PATENT DOCUMENTS

| | | | |
|---|---|---|---|
| WO | 2019070579 | | 4/2019 |
| WO | 2019138079 | A1 | 7/2019 |
| WO | 2019165224 | A1 | 8/2019 |

OTHER PUBLICATIONS

Abinader F., et al., "Impact of Bandwidth Part (BWP) Switching on 5G NR System Performance", 2019 IEEE 2nd 5G World Forum (5GWF) IEEE, Sep. 30, 2019, XP033665220, pp. 161-166.

* cited by examiner

| NR Operating Band | UL Operating Band (MHz) | DL Operating Band (MHz) | Duplex Mode |
|---|---|---|---|
| n1 | 1920-1980 | 2110-2170 | FDD |
| n2 | 1850-1910 | 1930-1990 | FDD |
| n3 | 1710-1785 | 1805-1880 | FDD |
| n5 | 824-849 | 869-894 | FDD |
| n7 | 2500-2570 | 2620-2690 | FDD |
| n8 | 880-915 | 925-960 | FDD |
| n12 | 699-716 | 729-746 | FDD |
| n20 | 832-862 | 791-821 | FDD |
| n25 | 1850-1915 | 1930-1995 | FDD |
| n28 | 703-748 | 758-803 | FDD |
| n34 | 2010-2025 | 2010-2025 | TDD |
| n38 | 2570-2620 | 2570-2620 | TDD |
| n39 | 1880-1920 | 1880-1920 | TDD |
| n40 | 2300-2400 | 2300-2400 | TDD |
| n41 | 2496-2690 | 2496-2690 | TDD |
| n50 | 1432-1517 | 1432-1517 | TDD |
| n51 | 1427-1432 | 1427-1432 | TDD |
| n66 | 1710-1780 | 2110-2200 | FDD |
| n70 | 1695-1710 | 1995-2020 | FDD |
| ⋮ | ⋮ | ⋮ | ⋮ |
| n86 | 1710-1780 | N/A | SUL |

610a
610b
602
Time
612
608
606
Frequency
604

602
Time
606
608
Frequency
604

602
Time
606
608
Frequency
604

DL
UL
Guard Band

ANCHOR AND COMPLEMENTARY BANDWIDTH PARTS FOR FULL-DUPLEX OPERATIONS

CROSS-REFERENCE TO RELATED APPLICATIONS

The present application claims priority to U.S. Provisional Patent Application No. 63/051,817 to Abotabl, et al., titled "Anchor and Complementary Bandwidth Parts for Full-Duplex Operations," filed Jul. 14, 2020, the contents of which is incorporated by reference in its entirety herein.

TECHNICAL FIELD

The technology discussed below relates generally to wireless communication systems, and more particularly, to configuring bandwidth parts (BWPs) for a scheduled entity in networks supporting full duplex slot formats.

INTRODUCTION

Wireless communications are conveyed in uplink (UL) transmissions, from a scheduled entity, such as a user equipment (UE) or other wireless communications device, to a scheduling entity, such as a base station, and in downlink (DL) transmissions from the scheduling entity to the scheduled entity. Frequency division duplex (FDD) communications allow simultaneous two-way communication by separating the frequencies used for uplink (UL) and downlink (DL) transmissions. Separating the frequencies used for UL and DL transmissions allows the UL transmissions to be isolated from the DL transmissions in the frequency domain. The isolation in the frequency domain reduces interference from a transmitter at a receiver during a full duplex communications exchange. Time division duplex (TDD) communications allow non-simultaneous two-way communications by employing one set of frequencies for both UL and DL transmissions in the frequency domain while designating some time slots for UL transmission and other time slots for DL transmission. In TDD half-duplex communications, UL and DL transmissions occur at the same frequencies, and are isolated from one another in time.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) is disclosed in a wireless communication network, wherein the UE includes: a wireless transceiver; a memory; and a processor communicatively coupled to the wireless transceiver and the memory, wherein the processor and the memory are configured to: receive a message indicating an active bandwidth part (BWP) of a plurality of BWPs of a carrier bandwidth for the UE; and communicate with a base station to configure a second BWP of the plurality of BWPs to be complementary to the active BWP, based on a determined slot format or signaling priority of the active BWP, wherein the second BWP is designated as a new BWP for the UE based on the active BWP being deactivated.

In one example, a method is disclosed of full duplex communication in a user equipment (UE), wherein the method includes: receiving a message indicating an active bandwidth part (BWP) of a plurality of BWPs of a carrier bandwidth for the UE; and communicating with a base station to configure a second BWP of the plurality of BWPs to be complementary to the active BWP, based on a determined slot format or signaling priority of the active BWP, wherein the second BWP is designated as a new BWP for the UE based on the active BWP being deactivated.

In one example, a scheduling entity is disclosed in a wireless communication network, including: a wireless transceiver; a memory; and a processor communicatively coupled to the wireless transceiver and the memory, wherein the processor and the memory are configured to: transmit a first message indicating an active bandwidth part (BWP) of a plurality of BWPs of a carrier bandwidth for a scheduled entity; and transmit a second message to the scheduled entity to configure a second BWP of the plurality of BWPs to be complementary to the active BWP based on a determined slot format or signaling priority of the activated BWP, wherein the second BWP is designated as a new BWP for the UE based on the activated BWP being deactivated.

In one example, a method is disclosed of full duplex communication in a scheduling entity, comprising: transmitting a first message indicating an active bandwidth part (BWP) of a plurality of BWPs of a carrier bandwidth for a scheduled entity; and transmitting a second message to the scheduled entity to configure a second BWP of the plurality of BWPs to be complementary to the active BWP based on a determined slot format or signaling priority of the activated BWP, wherein the second BWP is designated as a new BWP for the UE based on the activated BWP being deactivated.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
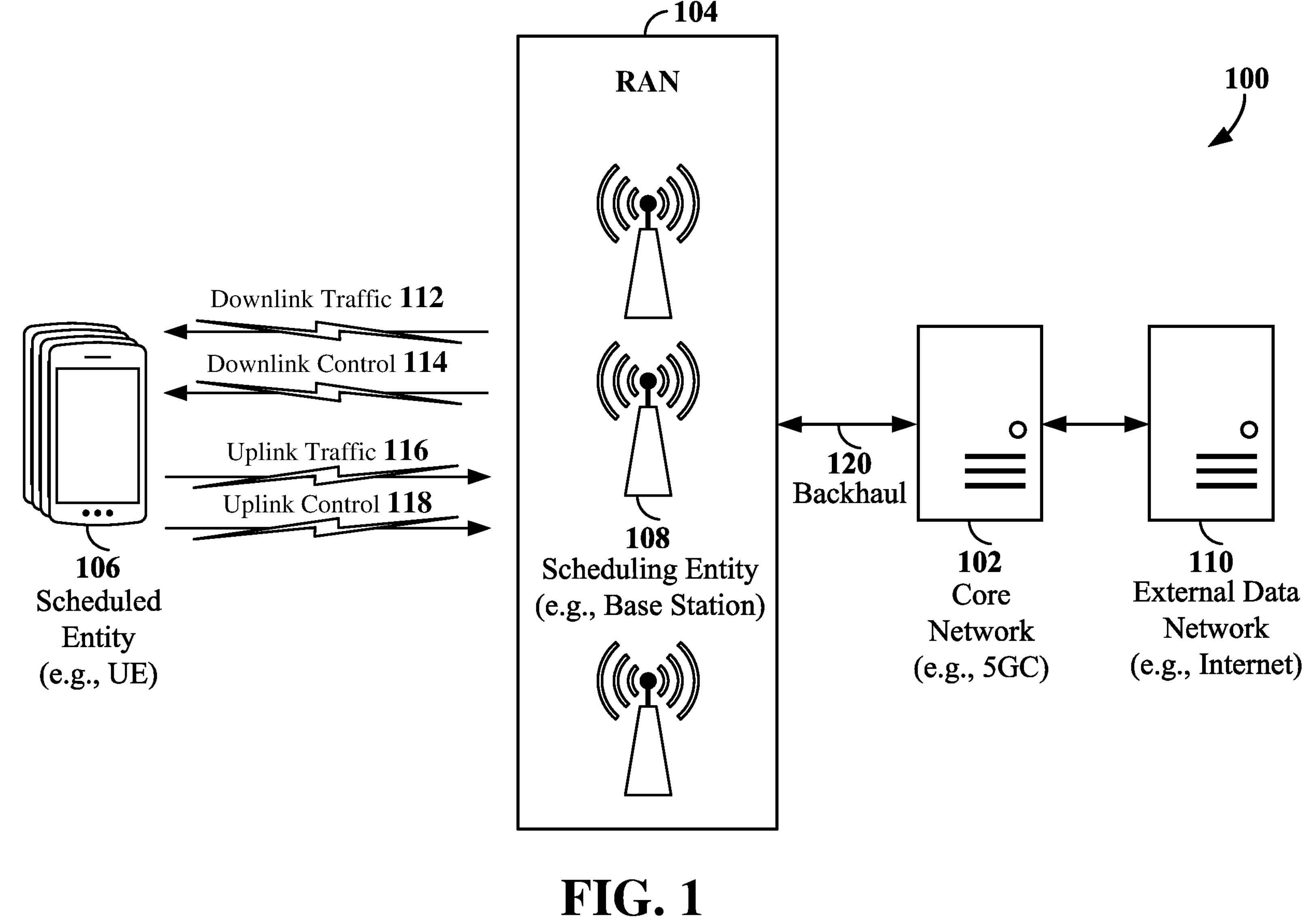
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated arrangements, end-user devices, etc. of varying sizes, shapes, and constitution.

For frequency division duplex (FDD) full duplex (FD) communications to be realized, self-interference from a transmitter of a user equipment (UE) or a base station should be minimized to avoid saturating sensitive amplifiers and front ends of receivers of the UE and base station. To isolate a signal transmitted by a transmitter from a receiver, the frequency band used by the transmitter may be separated from the frequency band used by the receiver. The gap between the two frequency bands may be referred to as a guard band. For time division duplex (TDD) half-duplex (HD) communications, the need for a guard band is obviated because the transmission band and the reception band are one and the same. A TDD HD scheme therefore uses less bandwidth than an FDD FD scheme, by using the same sub-channels for transmission and reception at separate times.

Work is advancing on the simultaneous use of the same frequency resources for both UL and DL in a given time slot. Such use may be referred to herein as TDD full duplex or TDD FD. Scheduled entities (e.g., UEs or other wireless communication devices) that are able to operate in a full duplex mode may be able to use TDD FD to increase the amount of data transferred in comparison to TDD HD, because, as with FDD FD, data may be transmitted and received at the same time, while in contrast to FDD FD, the data may be transmitted and received at the same frequency.

Scheduling entities (e.g., gNBs or other network access nodes) may be early adopters of TDD FD. In this way, the radio access networks will be ready to provide the improved use of bandwidth for scheduled entities as scheduled entities that are TDD FD capable are brought into use. However, not all scheduled entities will be able to implement TDD FD operation. For example, some scheduled entities may have an inexpensive front end that includes a switch that couples an antenna to either the scheduled entity receiver or the scheduled entity transmitter, depending on the state of the switch. Such designs minimize cost and complexity by doing away with relatively expensive and complex multiplexors and/or circulators at the front ends of scheduled entities.

Scheduling entities that are able to conduct TDD FD operations may be oblivious to the capabilities of the scheduled entities they serve and may seek to configure time slots for TDD FD operation. To configure a time slot for TDD FD operation, the scheduling entity may configure a time slot (including a set of OFDM symbols) for simultaneous use of the same frequency resource (e.g., use of one new radio operating band radio channel currently designated for TDD HD operation) for both transmission and reception. An OFDM symbol for TDD FD use may be referred to as a downlink-uplink (DU) symbol. A DU symbol may be different from an uplink (UL) symbol, a downlink (DL) symbol, and a flexible (F) symbol. For example, the DL symbol and the UL symbol are reserved for DL transmission and UL reception, respectively. DL transmission and UL reception are examples of unidirectional communication. DL transmission and UL reception may occur at the same time at different frequencies (as in the case of FDD FD) or at different times at the same frequency (as in the case of TDD HD), but do not occur at the same time at the same frequency (as in the case of TDD FD). The F symbol is interpreted as either a UL symbol or a DL symbol and as such has the same characteristics of either a DL symbol or a UL symbol. An F symbol does not combine the characteristics of the UL symbol and the DL symbol.

Accordingly, a scheduling entity may configure a slot with at least one downlink-uplink (DU) symbol reserved for both downlink transmission to and uplink reception from a scheduled entity (e.g., a UE or other wireless communication device) at the same time at the same frequency. In such a circumstance, the behavior of a non-TDD FD scheduled entity (referred to herein as a scheduled entity, a half-duplex scheduled entity, a full duplex-aware scheduled entity, an FD-aware scheduled entity, a half-duplex UE, an HD UE, a full duplex-aware UE, or an FD-aware UE) may be undefined. According to some aspects, HD UE behavior when encountering a slot formatted with at least one DU symbol may be unchanged compared to a legacy behavior where the HD UE reads only a SlotFormatCombinationID (e.g., 802 of FIG. 8).

Defining the behavior of a non-TDD FD UE when encountering DU symbols may enable the non-TDD FD UE (e.g., new or legacy TDD HD UEs, or full duplex-aware UEs) to continue operations in wireless network environments that begin to use TDD FD transceivers and may provide for ongoing and future use of lower cost non-TDD FD UEs in a TDD FD environment.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
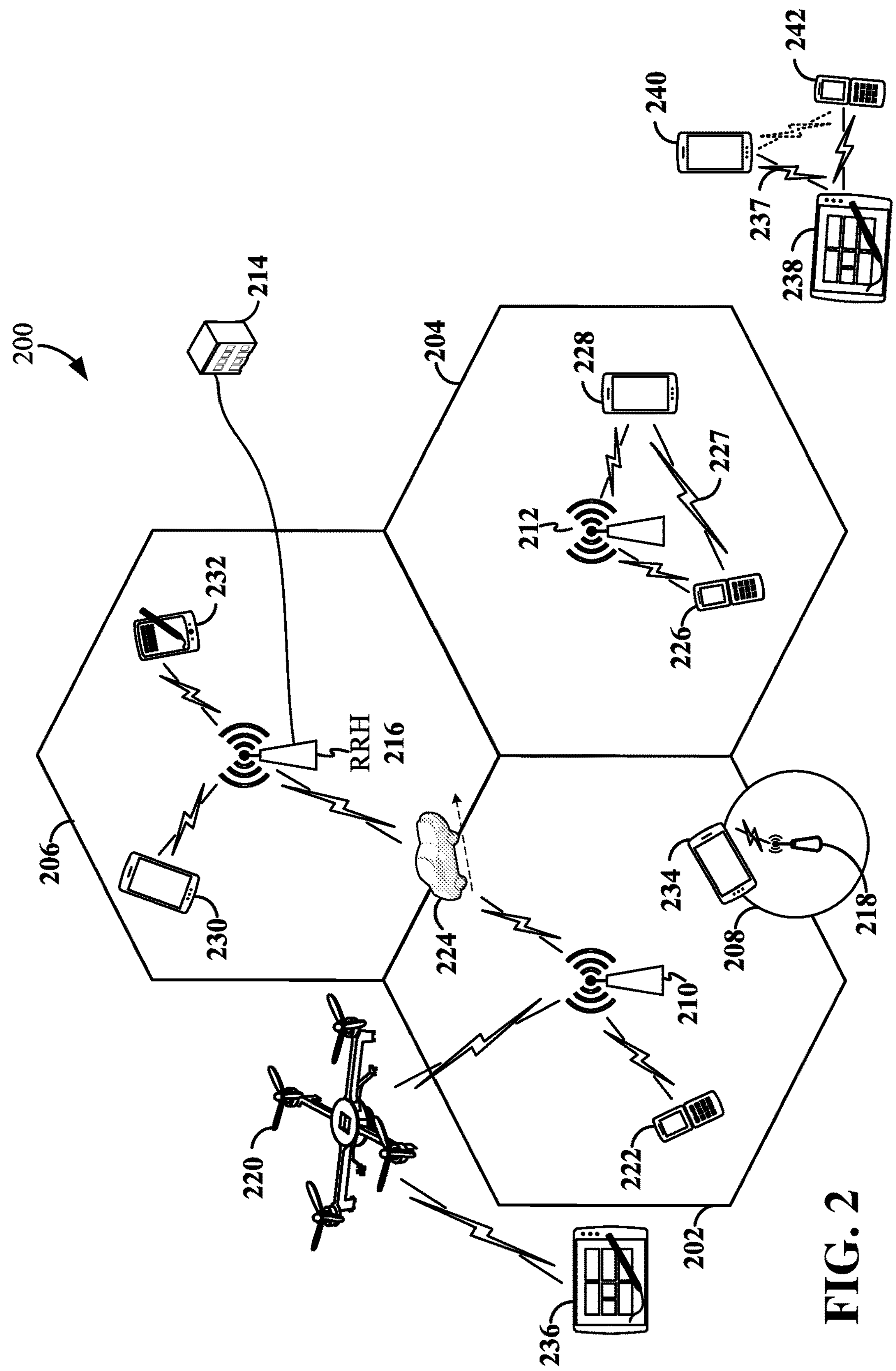
FIG. 2 is a conceptual illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex or TDD FD.

Figures 3A, 3B, 3C:
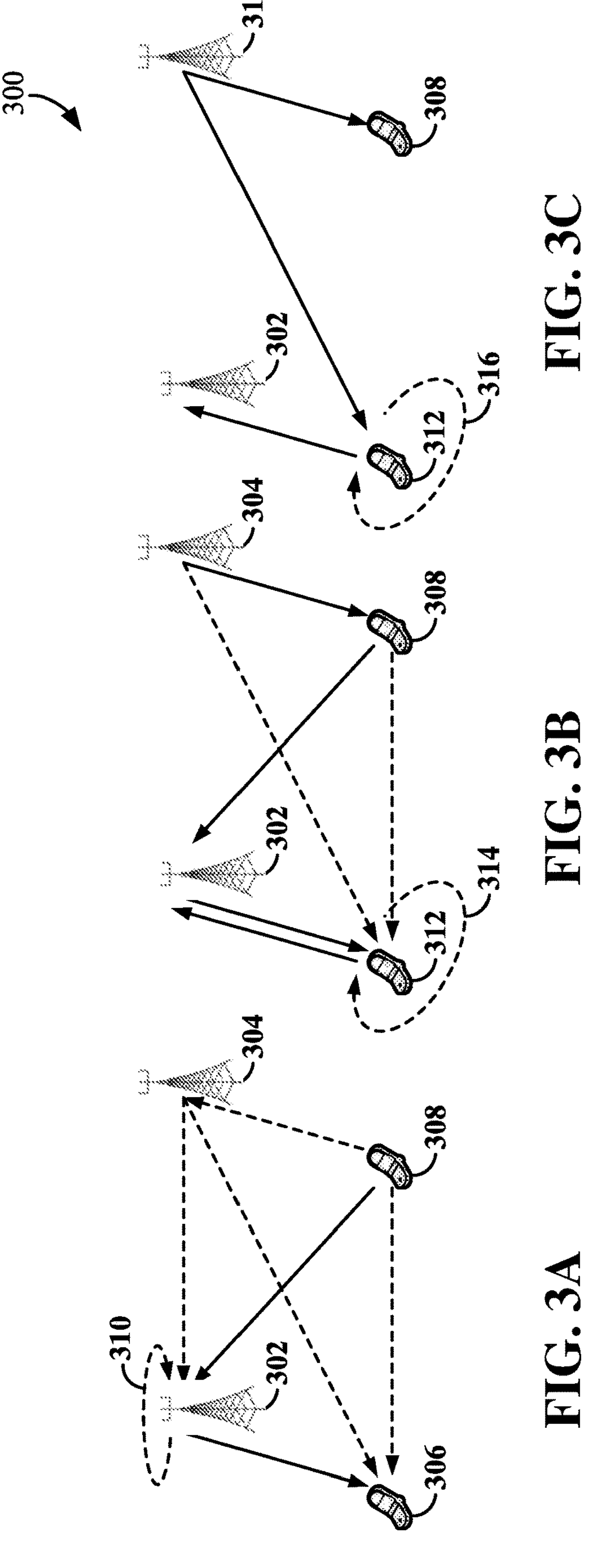
FIGS. 3A, 3B, and 3C are schematic illustrations of a wireless communication network and sources of interference for a full duplex gNB, a half-duplex user equipment (UE), a first full duplex UE, and a second full duplex UE according to some aspects of the disclosure.

FIGS. 3A, 3B, and 3C are schematic illustrations of a wireless communication network 300 and sources of interference for a full duplex gNB 302 (e.g., a scheduling entity), a half-duplex UE 306, a first full duplex UE 312, and a second full duplex UE 308 according to some aspects of the disclosure. In FIG. 3A, the full duplex gNB 302 is transmitting to the half-duplex UE 306. During the time of the transmission from the full duplex gNB 302 to the half-duplex UE 306, the full duplex gNB 302 is receiving, at its receiver (not shown), self-interference 310 from its own transmission to the half-duplex UE 306 as well as interference from a neighboring gNB 304 and an uplink transmission from a second full duplex UE 308. The half-duplex UE 306 is also receiving interference from the second full duplex UE 308 and the neighboring gNB 304. Because it is a half-duplex UE, the half-duplex UE 306 is not transmitting during the time of the transmission from the full duplex gNB 302 to the half-duplex UE 306, and therefore, the half-duplex UE 306 receives no self-interference.

In FIG. 3B, the full duplex gNB 302 is transmitting a downlink transmission to the first full duplex UE 312. During the time of the transmission of the downlink transmission from the full duplex gNB 302 to the first full duplex UE 312, the full duplex gNB 302 is receiving, at its receiver (not shown), a simultaneous uplink transmission from the first full duplex UE 312. At the same time as the just mentioned simultaneous downlink and uplink transmissions, the first full duplex UE 312 is receiving, at its receiver (not shown), self-interference 314 from its own transmission to the full duplex gNB 302 as well as interference from the neighboring gNB 304 and interference from the second full duplex UE 308.

In FIG. 3C, the full duplex gNB 302 is receiving an uplink transmission from the first full duplex UE 312. During the time of the transmission of the uplink transmission to the full duplex gNB 302, the first full duplex UE 312 is also receiving a transmission from a multi-transmission and reception point (TRP) station (e.g., a macro-cell, small cell, pico-cell, femto-cell, remote radio head, relay node, etc.), here represented as a multi-TRP wireless transceiver station 318. In addition to the signal received from the multi-TRP wireless transceiver station 318, the first full duplex UE 312 is also receiving, at its receiver (not shown), self-interference 316 from its own transmission to the full duplex gNB 302.

For the half-duplex UE 306 of FIG. 3A, interference may be mitigated if the interference from the neighboring gNB 304 and second full duplex UE 308 are at frequencies other than those occupied by the downlink transmission from the full duplex gNB 302 to the half-duplex UE 306. Similarly, for the first full duplex UE 312 of FIGS. 3B and 3C, interference may be mitigated if the self-interference 316 from the first full duplex UE 312, interference from the neighboring gNB 304, and/or interference from the second full duplex UE 308 are at frequencies other than those occupied by the downlink transmission from the full duplex gNB 302 to the half-duplex UE 306.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
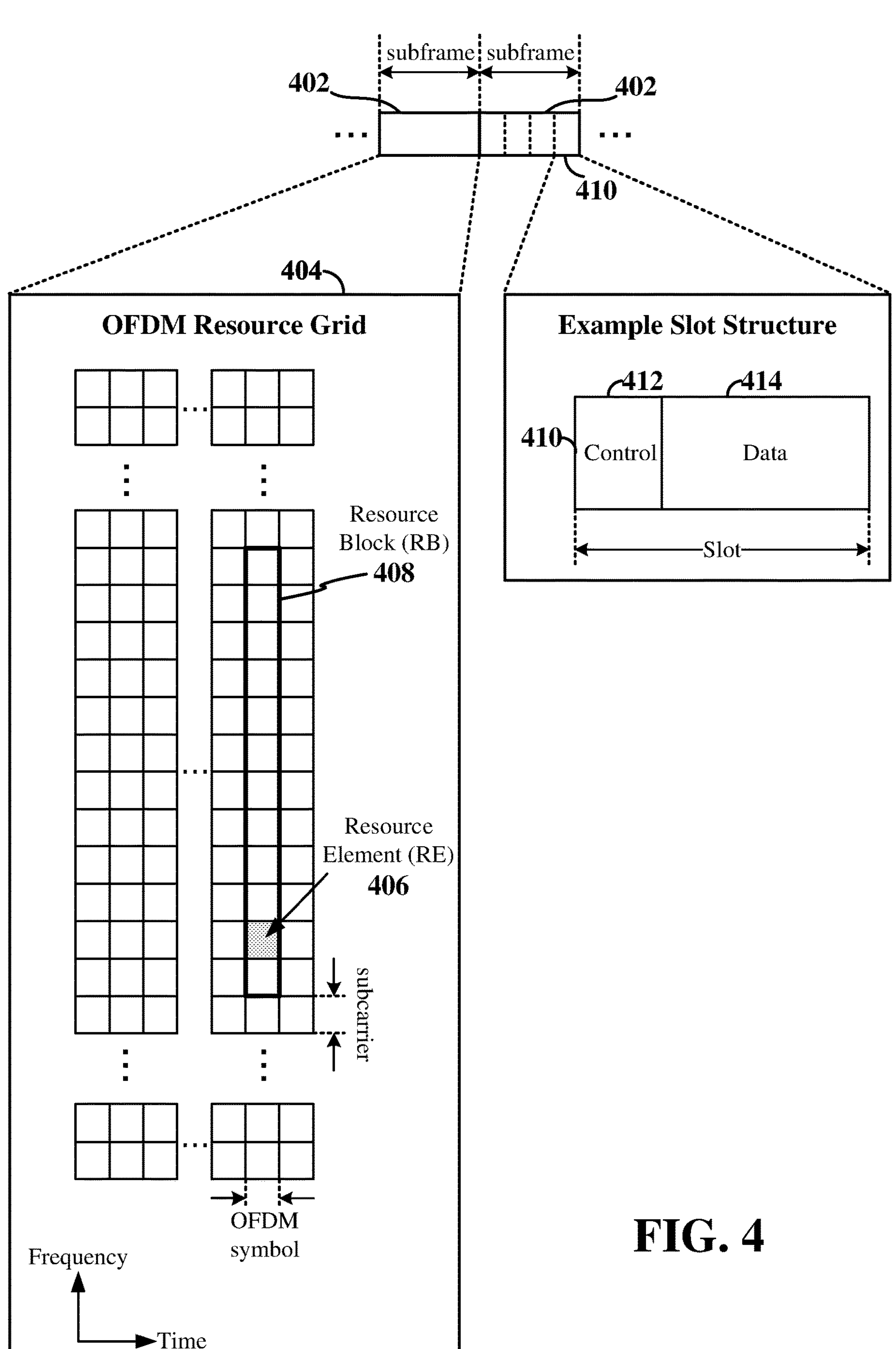
FIG. 4 is a schematic illustration of an organization of wireless resources in an air interface utilizing orthogonal frequency divisional multiplexing (OFDM) according to some aspects of the disclosure.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above and illustrated in FIGS. 1-4 are not necessarily all the channels or carriers that may be utilized between a scheduling entity (e.g., base station 108) and scheduled entities (e.g., one of more UE 106), and those of ordinary skill in the art will recognize that other channels or carriers may be utilized in addition to those illustrated, such as other traffic, control, and feedback channels.

Figures 5A, 5B, 5C, 5D:
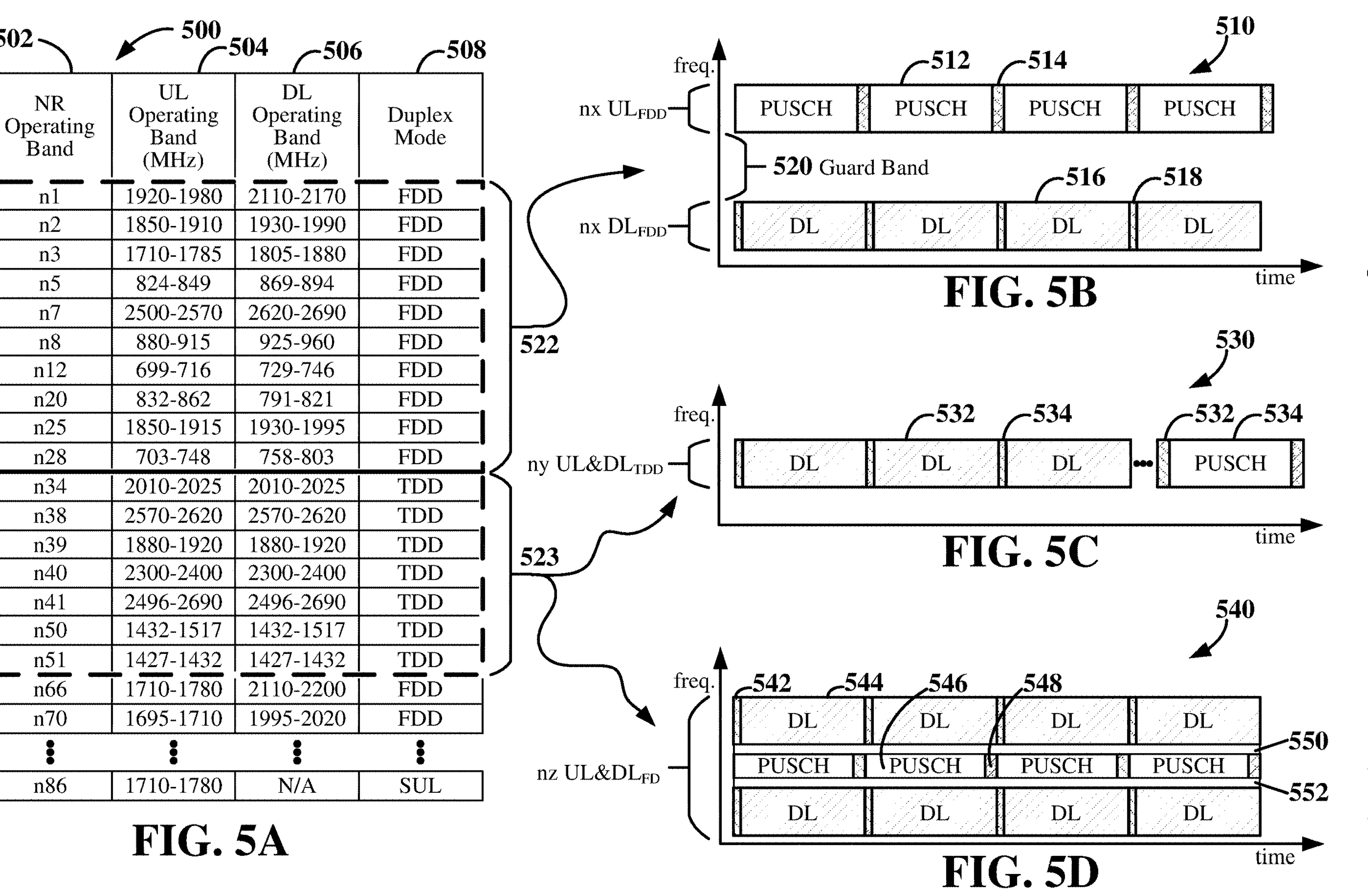
FIG. 5A is a tabular depiction of a plurality of new radio (NR) operating bands (e.g., radio channels), UL operating band frequencies, DL operating band frequencies, and the duplex mode associated with each of the NR operating bands according to some aspects of the disclosure.
FIG. 5B is a diagram illustrating an FDD FD modulation scheme according to some aspects of the disclosure.
FIG. 5C is a diagram illustrating a TDD HD modulation scheme according to some aspects of the disclosure.
FIG. 5D is a diagram illustrating a TDD FD modulation scheme according to some aspects of the disclosure.

FIG. 5A is a tabular depiction 500 of a plurality of new radio (NR) operating bands 502 (e.g., radio channels), UL operating band frequencies 504, DL operating band frequencies 506, and duplex modes 508 associated with each of the NR operating bands 502 according to some aspects of the disclosure.

FIG. 5B is a diagram illustrating an FDD FD modulation scheme 510 according to some aspects of the disclosure. In the example shown in FIG. 5B, time is illustrated along the horizontal axis while frequency is illustrated along the vertical axis. A plurality of physical uplink shared channels (PUSCHs) 512 and uplink control channels 514 are depicted as occupying the UL operating band identified as nx $UL_{FDD}$. A plurality of downlink data channels 516 (e.g., physical downlink shared channels (PDSCHs)) and downlink control channels 518 are depicted as occupying the DL operating band identified as nx $DL_{FDD}$. The UL operating band, nx $UL_{FDD}$, and the DL operating band, nx $DL_{FDD}$, are depicted as being separated in frequency by a guard band 520. The paired use of the nx $UL_{FDD}$ uplink operating band and the nx $DL_{FDD}$ operating band of a given, nx operation band may be referred to as paired spectrum. The nomenclature "nx" represents any one of the NR operating bands 502 designated for FDD duplex mode 508. A sub-group 522 of all NR operating bands 502 designated for FDD duplex mode 508 is denoted in FIG. 5A. The operating bands are exemplary and non-limiting.

FIG. 5C is a diagram illustrating a TDD HD modulation scheme 530 according to some aspects of the disclosure. In the example shown in FIG. 5C, time is illustrated along the horizontal axis while frequency is illustrated along the vertical axis. A plurality of downlink data channels 532 and downlink control channels 534 are depicted as occupying the operating band identified as ny $UL\&DL_{TDD}$. The single operating band, ny $UL\&DL_{TDD}$, is utilized for uplink and downlink by separating the UL and DL information in time (e.g., they do not occupy the same time slots simultaneously). The unpaired use of the nx $UL_{FDD}$ uplink operating band and the nx $DL_{FDD}$ operating band (both at a same frequency, or a same frequency band, of a given, nx operation band may be referred to as unpaired spectrum. A physical uplink shared channel (PUSCH) 536 and uplink control channel 538 are depicted as occupying the single operating band, ny $UL\&DL_{TDD}$. The nomenclature "ny" represents any one of the NR operating bands 502 designated for TDD duplex mode 508. A sub-group 523 of all NR operating bands 502 designated for TDD duplex mode 508 is denoted in FIG. 5A. The operating bands are exemplary and non-limiting.

Figures 6A, 6B, 6C:
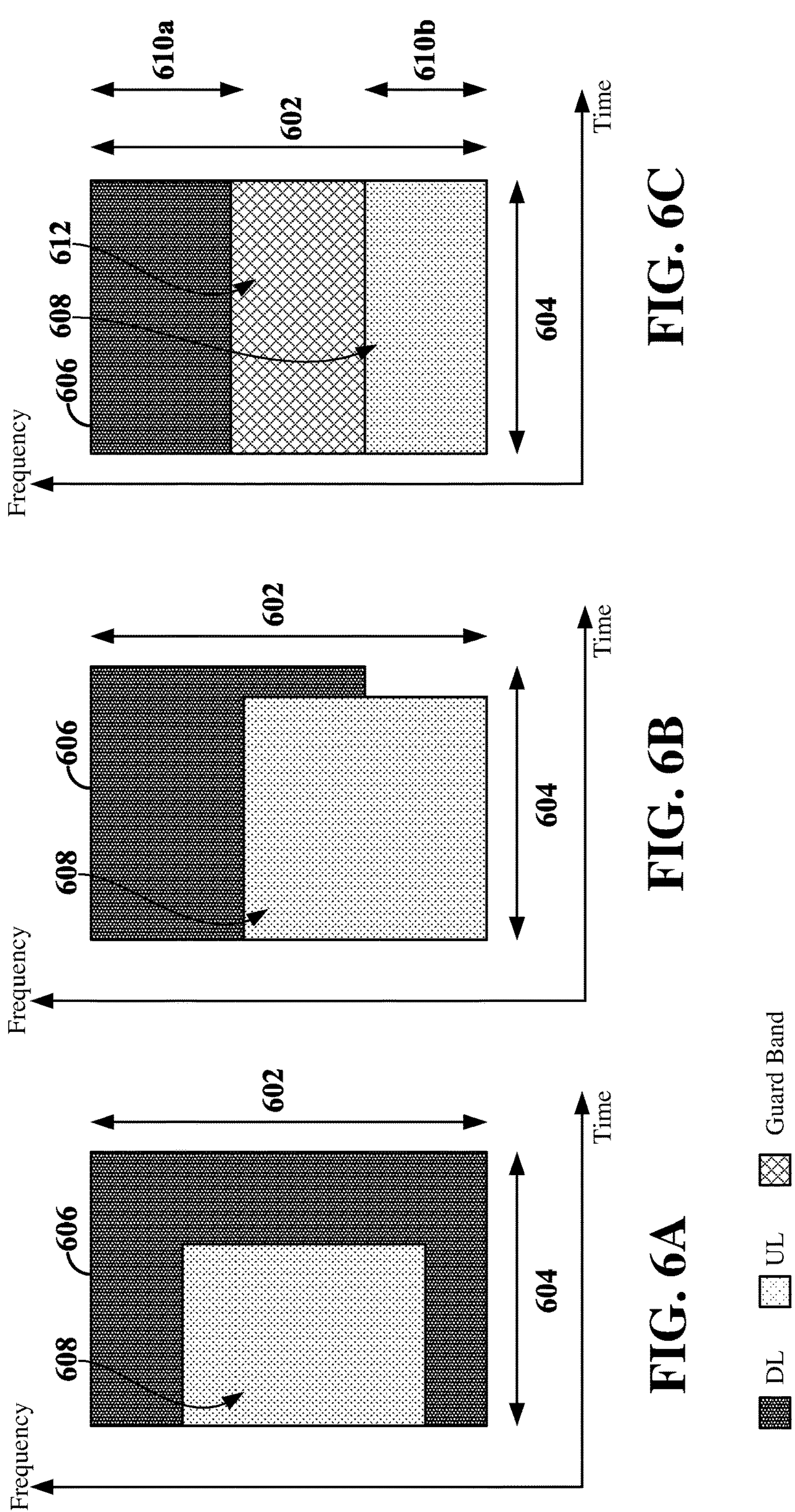
FIGS. 6A-6C illustrate examples of full-duplex communication in unpaired spectrum.

FIG. 5D is a diagram illustrating a TDD FD modulation scheme 540 according to some aspects of the disclosure. In the example shown in FIG. 5D, time is illustrated along the horizontal axis while frequency is illustrated along the vertical axis. As illustrated in the exemplary diagram of FIG. 5D, a full duplex network may utilize sub-band full-duplex (SBFD) (e.g., as illustrated in FIG. 6C) in unpaired spectrum, in which transmissions in different directions are carried in different sub-bands or BWPs of the carrier bandwidth A plurality of downlink data channels 544 and downlink control channels 542 and a plurality of PUSCHs 546 and uplink control channels 548 are all depicted as occupying the operating band identified as nz UL&DLFD. The single operating band, nz UL&DLFD, is utilized for uplink and downlink without separating the UL and DL information in time (e.g., they do occupy the same time slots simultaneously). The nomenclature "nz" represents any one of the NR operating bands 502 designated for TDD duplex mode 508. A sub-group 523 of all NR operating bands 502 designated for TDD duplex mode 508 is denoted in FIG. 5A. A first guard band 550 and a second guard band 552 are depicted in FIG. 5D. The first guard band 550 and the second guard band 552 may be the same bandwidth or different bandwidths. Either or both of the first guard band 550 and the second guard band 552 may be zero bandwidth guard bands. The first guard band 550 and the second guard band 552 (individually or collectively) in the unpaired spectrum may be smaller than the guard band 520 in the paired spectrum.

FIGS. 6A-6C illustrate examples of full-duplex communication in unpaired spectrum. In the examples shown in FIGS. 6A-6C, time is in the horizontal direction and frequency is in the vertical direction. Here, a carrier bandwidth 602 (or set of one or more active bandwidth parts (BWPs)) is illustrated along the frequency axis and a slot 604 is illustrated along the time axis.

FIGS. 6A and 6B illustrate in-band full-duplex (IBFD) communication, while FIG. 6C illustrates sub-band FD (SBFD) communication. For IBFD communication, as shown in FIGS. 6A and 6B, downlink and uplink transmissions occur on the same time and frequency resources. For example, downlink resources 606 allocated for transmissions in the downlink direction overlap in both time and frequency with uplink resources 608 allocated for transmissions in the uplink direction. The overlap may be full (as shown in FIG. 6A) or partial (as shown in FIG. 6B).

For SBFD communication, as shown in FIG. 6C, the carrier bandwidth 602 (or active BWPs) may be divided into sub-bands 610*a* and 610*b*. Each sub-band 610*a* and 610*b* may be allocated for communication in a single direction. For example, sub-band 610*a* may be allocated for downlink transmissions, while sub-band 610*b* may be allocated for uplink transmissions. Thus, downlink resources 606 allocated for transmissions in the downlink direction overlap in time, but not in frequency, with uplink resources 608 allocated for transmissions in the uplink direction. The downlink resources 606 may further be separated from the uplink resources 608 in the frequency domain by a guard band 612 to isolate the uplink and downlink transmissions in frequency.

Figures 7A, 7B:
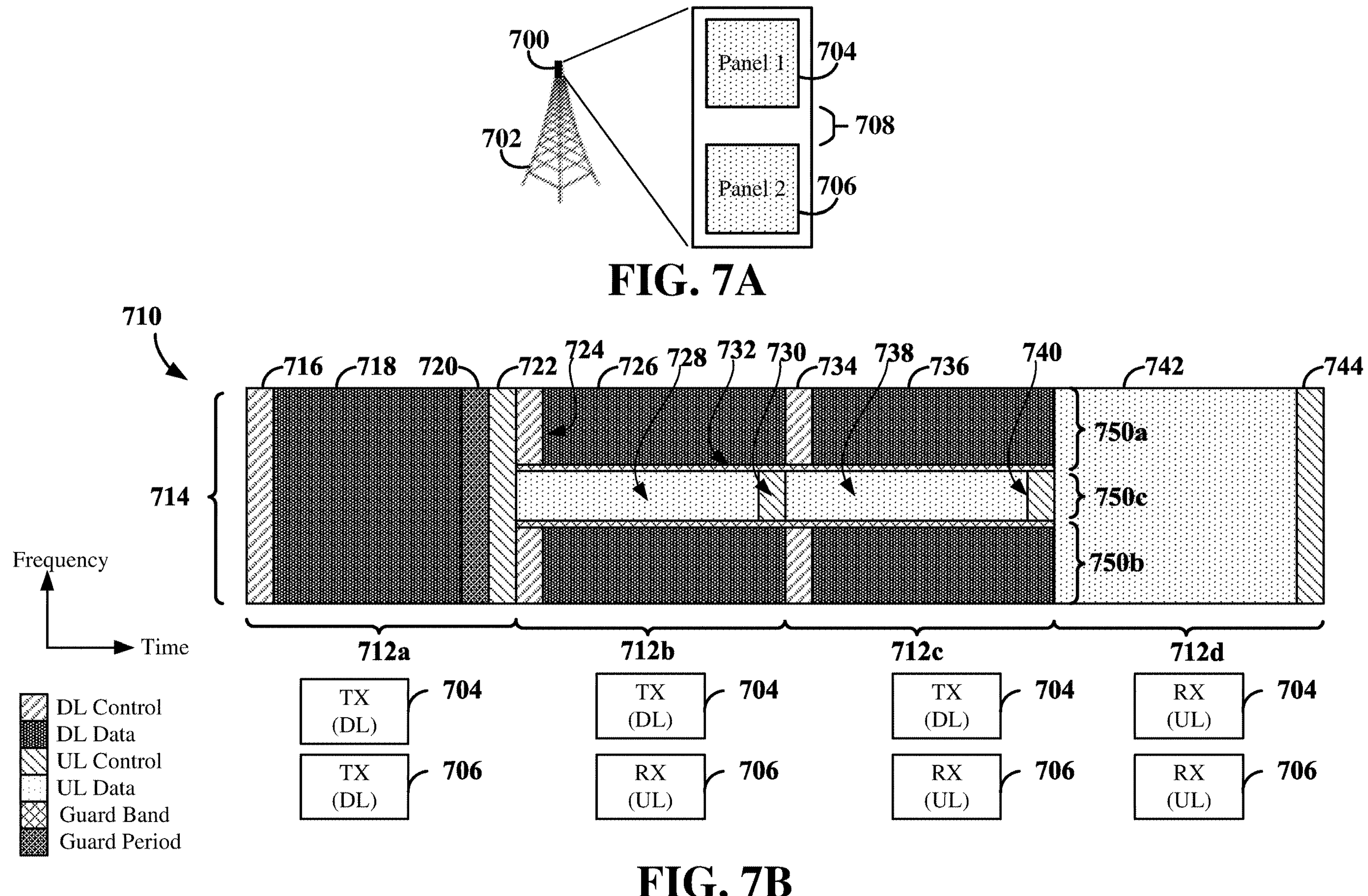
FIG. 7A is a schematic diagram of a base station (e.g., gNB) including a multi-panel antenna array configured for full-duplex communication according to some aspects of the disclosure.
FIG. 7B is a schematic illustration of an example of full-duplex wireless communication using the multi-panel antenna array shown in FIG. 7A according to some aspects of the disclosure.

FIG. 7A is a schematic diagram of a base station 702 (e.g., gNB) including a multi-panel antenna array 700 configured for full-duplex communication according to some aspects of the disclosure. The antenna array 700 is divided into two panels (panel 1 704, panel 2 706) with a physical separation 708 therebetween. Each of the two panels may be a subarray of antennas. A given panel may transmit and/or receive a beam or a beam group. In one example, the panels may be physically separated from one another by a distance selected to provide improved isolation between simultaneous transmission (Tx) and reception (Rx) operations in full-duplex mode, thereby mitigating at least a portion of self-interference resulting from signals being simultaneously transmitted/received. The multi-panel antenna configuration shown in FIG. 7A may also be applicable to UEs to enable full-duplex communication (e.g., SBFD) at the UE.

FIG. 7B is a schematic illustration of an example of sub-band full-duplex (SBFD) wireless communication 710 using the multi-panel antenna array 700 shown in FIG. 7A according to some aspects. In the example shown in FIG. 7B, time is in the horizontal direction with units of slots 712*a*-712*d*, each including a plurality of OFDM symbols; and frequency is in the vertical direction. Here, a carrier bandwidth 714 (or set of one or more active BWPs) is illustrated along the frequency axis. The carrier bandwidth 714 (or active BWPs) may be divided into a number of sub-bands 750*a*-750*c* for sub-band FD operation.

In the example shown in FIG. 7B, in slot 712*a*, the antenna array 700 is first configured for downlink (DL) communication (e.g., DL burst 716 and DL data portion 718). The DL burst 716 may include DL control transmitted within the first few symbols of the slot 712*a*. The DL control may include, for example, a physical downlink control channel (PDCCH) carrying DCI that may be related to the slot 712*a* or a previous or subsequent slot. In an example, the DCI may include common DCI or UE-specific DCI. The common DCI may include, for example, common control information broadcast to a group of UEs or all UEs in the cell. The UE-specific DCI may include, for example, HARQ feedback information (e.g., ACK/NACK), scheduling information for scheduling a downlink data transmission and/or uplink transmission in the slot 712*a* or a subsequent slot (e.g., slot 712*b*, 712*c*, and/or 712*d*), and other suitable information. The DL burst 716 may further include various DL reference signals (e.g., SSB and/or CSI-RS). In this example, both panel 1 704 and panel 2 706 may be configured for DL transmission. The DL data portion 718 may include DL data carried within, for example, a PDSCH. In addition to the DL data, the DL data portion 718 may further include DL reference signals (e.g., DMRS) for use in demodulating and decoding the DL data.

Slot 712*a* may also include a common uplink (UL) burst 722 at the end of slot 712*a*. The common UL burst 722 may include, for example, a PUCCH carrying UCI and other UL signals. As illustrated in FIG. 7B, the end of the DL data portion 718 may be separated in time from the beginning of the UL burst 722. This time separation 720 may sometimes be referred to as a gap, a guard period, a guard interval, and/or various other suitable terms. This separation may provide time for the base station and UE to perform a switch-over between transmitting and receiving, or vice-versa. In this example, both panel 1 704 and panel 2 706 may be configured for UL transmission during the UL burst 722.

In slots 712*b* and 712*c*, the antenna array 700 is configured for both DL communication and UL communication. For example, in slots 712*b* and 712*c*, the carrier bandwidth 714 (or active BWPs) is shown partitioned between uplink transmissions and downlink transmissions. Sub-bands 750*a* and 750*b* are allocated for downlink transmissions, while sub-band 750*c* is allocated for uplink transmissions. In an example operation of the sub-band full-duplex configuration shown in FIG. 7, panel 1 704 may be configured for DL transmission at both edges (e.g., sub-bands 750*a* and 750*b*) of the carrier bandwidth 714 (or active BWPs) and panel 2 706 may be configured for UL reception in the middle (e.g., sub-band 750*c*) of the carrier bandwidth 714 (or active BWPs).

In each of the sub-band FD slots 712*b* and 712*c*, the DL sub-bands 750*a* and 750*b* include a DL burst 724 and 734, respectively, which may include a PDCCH carrying DCI and/or DL reference signals, in the initial or beginning portion of the slots 712*b* and 712*c*. Following the DL bursts 724 and 734, slots 712*b* and 712*c* each include a DL data portion 726 and 736, respectively, for transmitting DL data within sub-bands 750*a* and 750*b*. For example, the DL data may be transmitted within a PDSCH. In addition to the DL data, the DL data portions 726 and 736 may further include DL reference signals (e.g., DMRS) for use in demodulating and decoding the DL data.

In the uplink (UL) sub-band 750*c*, the slots 712*b* and 712*c* each include an UL data portion 728 and 738, respectively, for transmitting UL data. For example, the UL data may be transmitted within a PUSCH. Following the UL data portions 728 and 738, the UL sub-band 750*c* of slots 712*b* and 712*c* each include an UL burst 730 and 740, respectively. The UL burst 730 and 740 may include, for example, a PUCCH including UCI and/or other UL signals. Guard bands 732 are further provided between the UL sub-band 750*c* and the DL sub-bands 750*a* and 750*b* to mitigate self-interference between simultaneous DL transmissions in the DL sub-bands 750*a* and 750*b* and UL transmissions in the UL sub-band 750*c*.

Slots 712*b* and 712*c* are sub-band FD slots utilizing FDM for multiplexing uplink and downlink transmissions in frequency. The sub-band full-duplex slot configurations shown in FIG. 7 are merely exemplary, and other configurations of sub-band full-duplex slots may be utilized in various aspects of the disclosure. For example, sub-band full-duplex slots including other configurations of UL and DL sub-bands (e.g., the configuration shown in FIG. 4C or other suitable sub-band configurations), may be employed in various aspects.

In slot 712*d*, the antenna array 700 is configured for UL communication. For example, slot 712*d* includes an UL data portion 742 followed by an UL burst 744. The UL data portion 742 and UL burst 744 may include UL control information and/or UL data, as discussed above. In this example, both panel 1 704 and panel 2 706 may be configured for UL reception. Slots 712*a* and 712*d* are half-duplex TDD slots utilizing TDM for multiplexing DL transmissions and UL transmissions in time.

In some aspects of the disclosure, one or more slots may be flexible slots including one or more flexible symbols that may be configured as either half-duplex symbols (e.g., all UL or all DL) or sub-band full-duplex symbols (e.g., including both UL and DL transmissions). For example, in slot 712*b*, the DL burst 724 may be configured to occupy all sub-bands 750*a*-750*c* of the slot 712*b*, and as such, the symbols corresponding to the DL burst 724 may be flexible symbols that may be configured as half-duplex symbols to enable DL communication across all sub-bands 750*a*-750*c*. Similarly, the UL burst 730 may be configured to occupy all sub-bands 750*a*-750*c* of the slot 712*b*, and as such, the symbols corresponding to the UL burst 730 may be flexible symbols that may be configured as half-duplex symbols to enable UL communication across all sub-bands 750*a*-750*c*.

In sub-band full-duplex operation, the slot formats can be classified according to the duplex mode of the base station. For example, the slot may be classified as a half-duplex slot (e.g., slot 712*a* or 712*b*) including symbols dedicated to either DL transmission or UL transmission based on TDM. In addition, the slot may be classified as a full-duplex (or sub-band full-duplex) slot (e.g., slot 712*b* or 712*c*) including a hybrid of DL and UL transmissions based on FDM. The slot may further be classified as a flexible slot that may be partially or fully configurable (e.g., one or more symbols may be flexible symbols).

In various aspects of the disclosure, to accommodate low latency and/or high reliability traffic, such as ultra-reliable low-latency communication (URLLC), a base station operating in sub-band full-duplex mode may dynamically change the slot format of a slot between half-duplex and sub-band full-duplex and/or may change flexible symbols within a flexible slot between half-duplex and sub-band full-duplex. A slot format indicator (SFI) indicating the slot format of the slot may be signaled, for example, via DCI mapped to a PDCCH or medium access control (MAC) control element (MAC-CE) mapped to a PDSCH.

Figure 8:
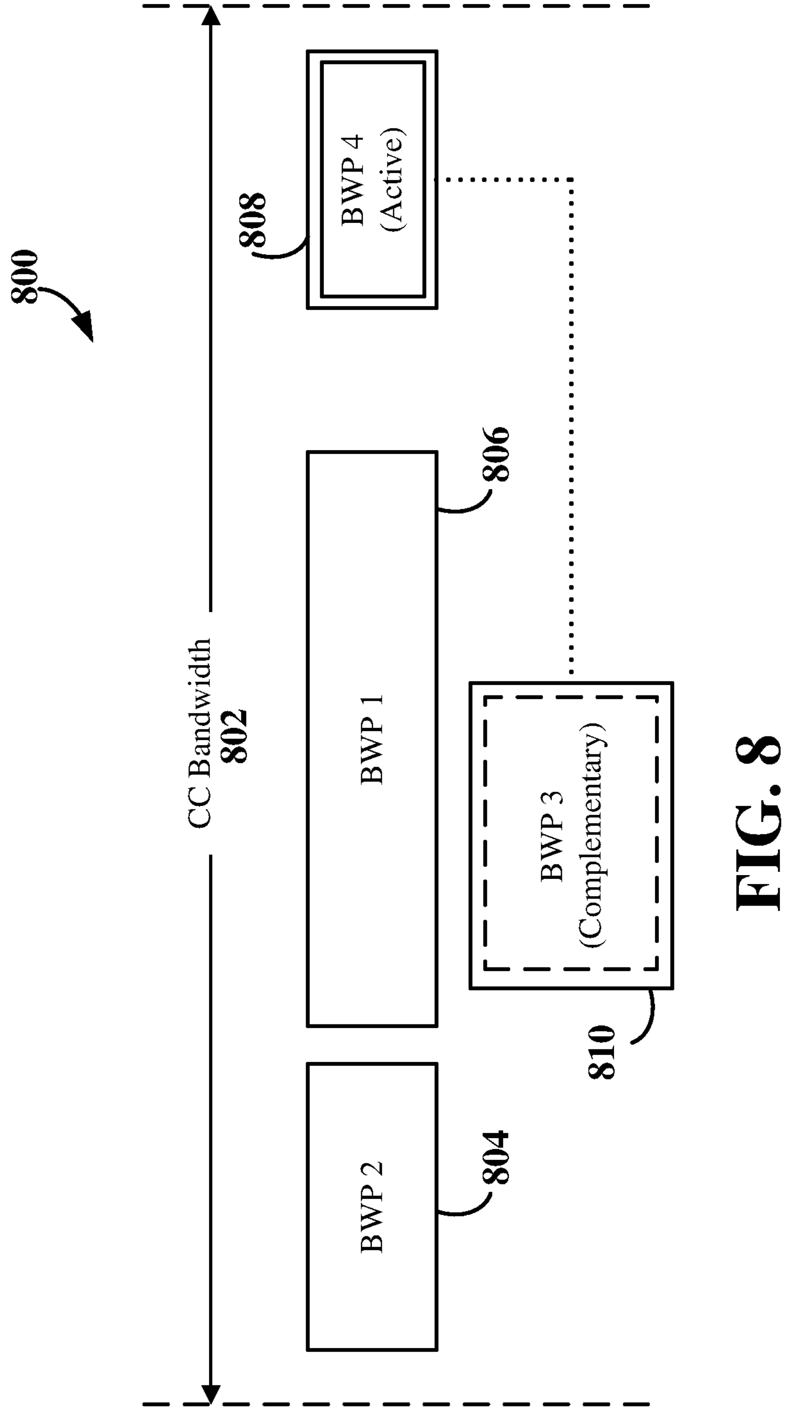
FIG. 8 is an illustration of bandwidth parts (BWPs) of a component carrier (CC) bandwidth, where a complementary BWP is determined for an active anchor BWP according to some aspects of the disclosure.

FIG. 8 is an illustration 800 of bandwidth parts (BWPs) (804-810) of a component carrier (CC) bandwidth 802, where a complementary BWP is determined for an active anchor BWP according to some aspects of the disclosure. Generally, BWPs are configured as a subset or a part of total carrier bandwidth (e.g., 802). A BWP forms a set of contiguous common resource blocks (CRBs) within the full component carrier bandwidth 802. In other words, within the carrier bandwidth, a BWP starts at a CRB and may span over a set of consecutive CRBs. Each BWP may be associated with its own numerology (e.g., sub-carrier spacing SCS and cycling prefix CP). A UE may be configured with up to four downlink BWPs and up to four uplink BWPs for each serving cell. In the case of supplementary uplink (SUL), there can be up to four additional uplink BWPs on the SUL carrier.

To enable reasonable UE battery consumption, only one BWP in the downlink and one in the uplink, are active at a given time on an active serving cell under typical operation. The active BWP defines the UE's operating bandwidth within the cell's operating bandwidth, and all other BWPs that the UE is configured with are deactivated. On deactivated BWPs, the UE does not transmit or receive any data. For TDD, a BWP-pair (active UL BWP and active DL BWP) must have the same center frequency and switch simultaneously. For FDD, the DL and UL BWP switch independently. When needed, the network can dynamically switch the UE to the desired BWP. With Bandwidth Adaptation (BA), the receive and transmit bandwidth of a UE need not be as large as the bandwidth of the cell and can be adjusted. The bandwidth can be ordered to change, where, for example, the UE can use a narrower BW for monitoring control channels and to receive a small/medium amount of data (to save power). Alternately or in addition, the UE can switch to full or large bandwidth when large amounts of data are to be scheduled. The location can move in the frequency domain (e.g., to increase scheduling flexibility) and the subcarrier spacing can be ordered to change (e.g., to allow different services).

BA is achieved by configuring the UE with BWPs and telling the UE which one of the configured BWPs is currently the active BWP. To enable BA on a primary cell (PCell), the gNB configures the UE with UL and DL BWP(s). To enable BA on secondary cells (SCells) in case of carrier aggregation (CA), the gNB configures the UE with at least DL BWP(s) i.e. there may or may not be any UL BWP for the SCell. A UE receives PDCCH and PDSCH in a DL BWP according to a configured SCS and CP length for the DL BWP. A UE transmits PUCCH and PUSCH in an UL BWP according to a configured SCS and CP length for the UL BWP. A UE is assumed to receive/transmit within active DL/UL BWP using the associated numerology. For downlink, the UE is not expected to receive PDSCH, PDCCH, or CSI-RS (except for radio resource management (RRM)) outside an active BWP. For uplink, the UE may not transmit PUSCH or PUCCH outside an active BWP and for an active cell, and the UE may not transmit SRS outside an active BWP.

For each DL BWP or UL BWP in a set of DL BWPs or UL BWPs, respectively, the UE may be provided with a plurality of parameters, including, but not limited to, a SCS using the field subcarrierSpacing, a cyclic prefix using the field cyclicPrefix, an index in the set of DL BWPs or UL BWPs by respective BWP-Id, a set of common and dedicated BWP parameters, and/or BWP's starting PRB location and a number of contiguous RBs which forms the BWP. As PRBs are the resource blocks that are used for actual transmission/reception, a set of PRBs may belong to and form a BWP. PRBs for a specific subcarrier configuration defined within a BWP are numbered from 0 to (size of BWP−1).

The network (e.g., via gNB) may impose BWP switching using RRC (re-) configuration, where the network includes firstActiveDownlinkBWP-Id and/or firstActive UplinkBWP-Id for a primary secondary cell (SpCell) or SCell within RRC (re-) configuration. Upon receiving RRC (re-) configuration of firstActiveDownlinkBWP-Id and/or firstActiveUplinkBWP-Id for SpCell, the UE may activate the downlink BWP and/or uplink BWP indicated by firstActiveDownlinkBWP-Id and/or firstActive UplinkBWP-Id respectively. For a SCell, the UE may not activate the downlink BWP and/or uplink BWP immediately after receiving the RRCReconfiguration, and instead activate the corresponding BWP at the time of SCell activation. The BWP switching can be controlled by the PDCCH indicating a downlink assignment or an uplink grant.

Alternately or in addition, the network may configure an inactivity timer (bwp-InactivityTimer), which is used to switch the active downlink BWP after an amount of inactivity specified by the timer field bwp-InactivityTimer. The expiration of the inactivity timer associated to a cell may switch the active BWP to a default BWP configured by the network (if configured). If the default downlink BWP is not configured, the active downlink BWP is switched to an initial downlink BWP. In some examples, the MAC entity, upon initiation of a random access (RA) procedure on a serving cell, may perform BWP switching. If physical random access channel (PRACH) occasions are not configured for the active UL BWP, the MAC layer may switch the active UL BWP to the initial uplink BWP. If PRACH occasions are configured for the active UL BWP, there is no need to switch the active UL BWP. For DL, switching may happen if the serving cell is a SpCell and if the BWP-Id of the active DL BWP is different from the BWP-Id of the active UL BWP.

One of the deficiencies in BWP switching is that the switching time between the active BWP and another BWP may take an excessive period of time. In full duplex (FD) mode operation, the UE may need to switch the active BWP often, due to the differences between the half-duplex (HD) slot and the FD slot, as well as the different frequency formats of the FD slot. In the example of FIG. 8, a UE may be configured with a plurality of BWPs (804-810), such that, for every active BWP 808 (anchor BWP), a complementary BWP 810 is associated with the active anchor BWP 808. Under such a configuration, switching delays between the current active anchor BWP (anchor BWP) 808 and the complementary BWP 810 may be very small compared to switching to other configured BWPs (e.g., 804, 806). The complementary BWP 810 configuration may or may not depend on the active anchor BWP 808 configuration according to some aspects of the present disclosure.

If the complementary BWP (e.g., 810) is dependent on an active anchor BWP (e.g., 808), the complementary BWP bandwidth frequency and allocation may depend on UE capabilities. For example, because the BWP switching delay may be a result of UE procedures such as RF tuning, configuring the complementary BWP to share a common bandwidth with the active anchor BWP may help in reducing RF tuning requirements. If the complementary BWP (e.g., 810) is independent from an active anchor BWP (e.g., 808), the UE may be configured to switch from the active anchor BWP to the complementary BWP in a shorter time frame. For example, the UE may be configured to perform RF tuning for both the active anchor BWP and complementary BWP and be subsequently configured to switch to the pre-tuned complementary BWP at a given time.

Figure 9:
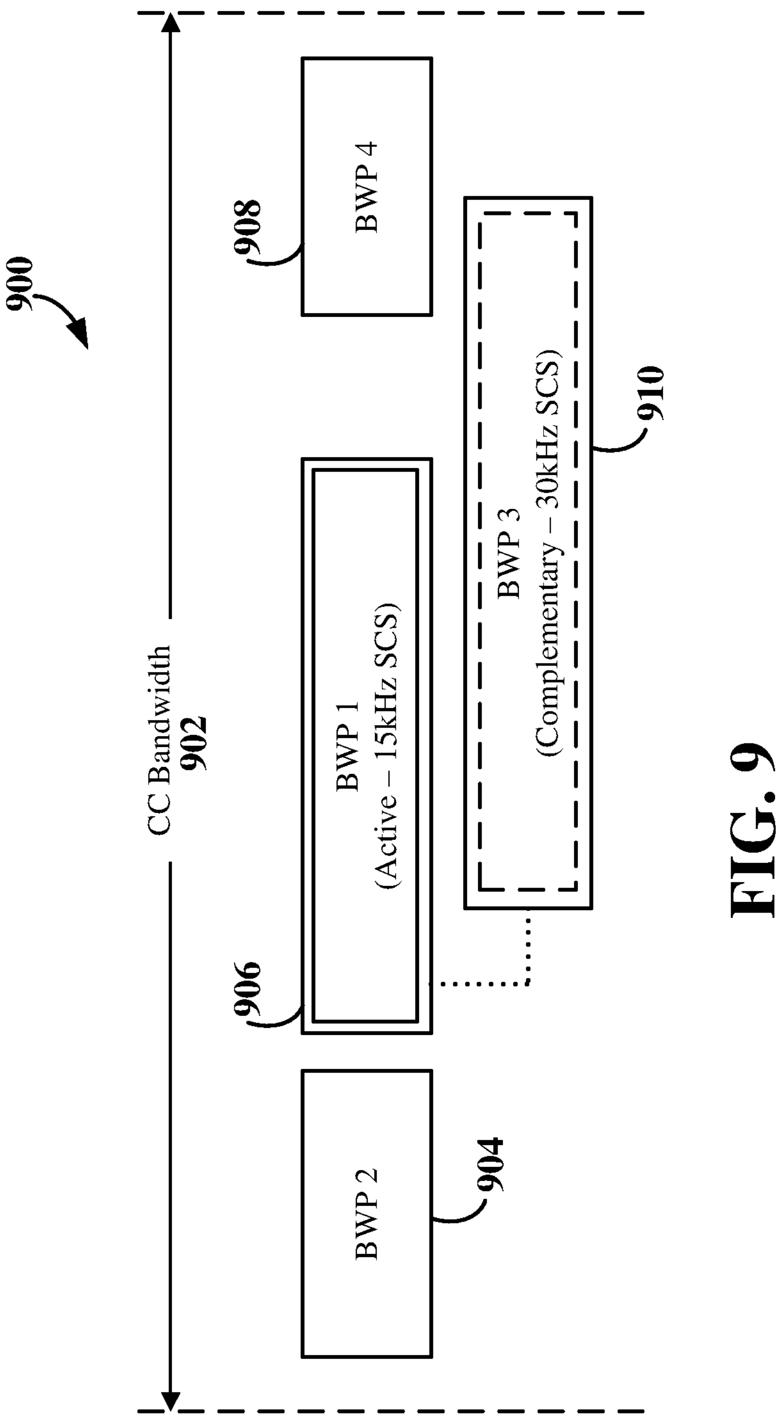
FIG. 9 is an illustration of BWPs of a CC bandwidth, where a complementary BWP having a different subcarrier spacing is determined for an active anchor BWP according to some aspects of the disclosure.

FIG. 9 is an illustration 900 of BWPs (904-910) of a CC bandwidth 902, where a complementary BWP 910 having a different subcarrier spacing (SCS) is determined for an active anchor BWP 906 according to some aspects of the disclosure. In this example, the complementary BWP 910 may be configured with a different SCS to support fast switching from the active anchor BWP 906 to more latency-constrained transmission modes, such as ultra-reliable low-latency communication, (URLLC) transmission. In some examples, the active anchor BWP 906 and complementary BWP 910 may be configured with certain configuration sets to operate at different formats or operating environments. In one example, each BWP may be configured with a slot format to operate in a manner where the active anchor BWP (e.g., 906) is configured for the half-duplex (HD) slot and the complementary BWP (e.g., 910) is configured for the full-duplex (FD) slot. In another example, the BWPs may be configured using UL BW thresholds, where the active anchor BWP 906 is configured to be in a FD slot with a smaller UL band, and is associated with a complementary BWP in a FD slot with a larger UL band. In some examples, the BWPs may be configured using different bandwidth priorities for operation, where an active anchor BWP (e.g., 906) may be configured to operate under low-priority signaling environments while the complementary BWP (e.g., 910) may be configured to operate under high-priority signaling environments (e.g., URLLC).

In some examples, a complementary BWP (e.g., 910) may be identified by the active anchor BWP (e.g., 906) using a flag or bit in the BWP configuration that refers to whether the BWP is complementary or not. In other examples, a BWP index may be used in the anchor BWP to find an information element (IE) that refers to the complementary BWP.

Figure 10:
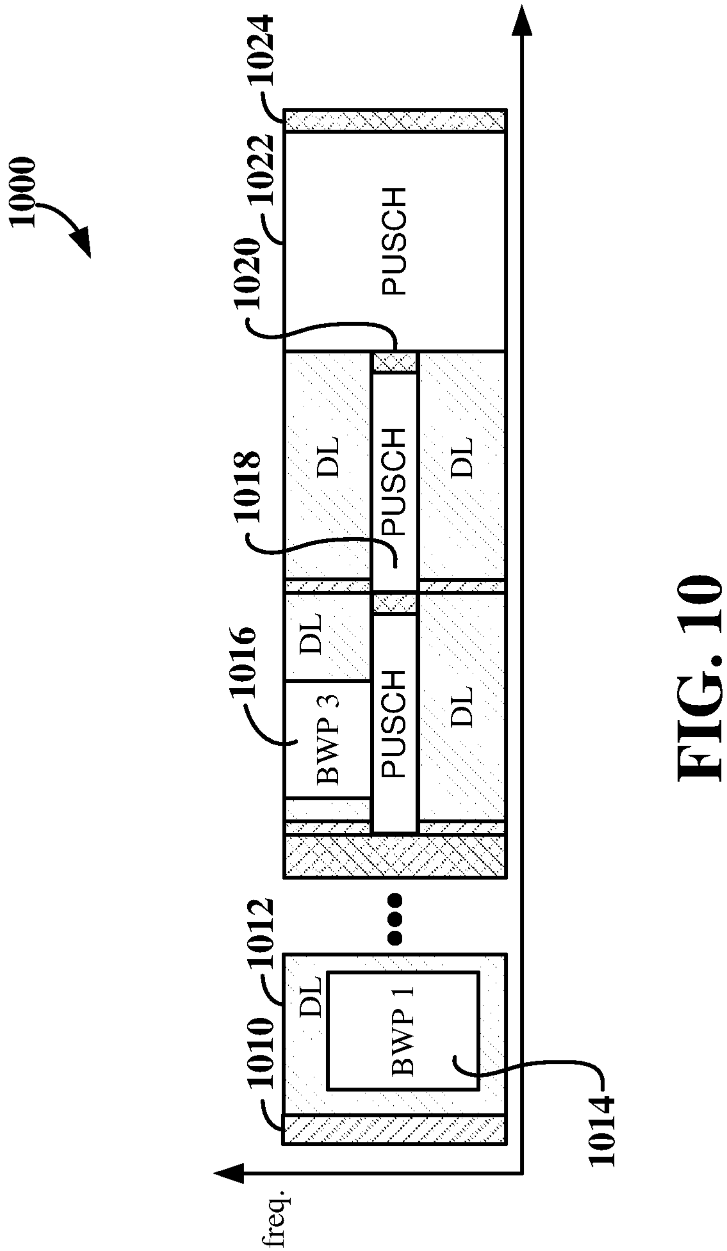
FIG. 10 is an illustration of an active anchor BWP and complementary BWP configured for transmission or reception for various DL and UL channels as may be implemented in a frequency division duplex (FDD) environment according to some aspects of the disclosure.

As discussed above, a UE may switch from an active anchor BWP to a complementary BWP under a plurality of configurations, including DCI signaling indicating the complementary BWP, via RRC reconfiguration. timer expiration, via MAC-CE, and/or a UE dormancy indication. In some aspects, the present disclosure provides additional BWP switching technologies and techniques for switching that include, but are not limited to, switching based on slot format and/or signaling priority. FIG. 10 is an illustration 1000 of an active anchor BWP 1014 and complementary BWP 1016 configured for transmission or reception for various DL and UL channels as may be implemented in a full duplex environment according to some aspects of the disclosure.

The example of FIG. 10 shows similar features to those discussed above in connection with FIG. 7B, where a full duplex antenna array may be transmitting a combination of DL control and DL data (similar to DL control 1010 and DL data 1012) and UL data (e.g., PUSCH 1018) and UL control 1020, where DL transmission and UL reception are configured. When the antenna array is only receiving UL data (e.g., PUSCH 1022) and UL control 1024, both panels may be configured for UL reception. In one example, the UE may switch from an anchor BWP (e.g., 1014) to the complementary BWP (e.g., 1016) and back when the UE transitions from a HD to a FD slot, and then back to HD again.

In some examples, the UE may also switch to a complementary BWP depending on a specific format of the FD slot. In other examples, the UE may switch to a complementary BWP depending on the priority of signaling, e.g., when the complementary BWP is configured with a larger SCS than the active anchor BWP. During operation, the UE may switch to the complementary BWP when it operates under a URLLC environment, and may utilize the anchor BWP when it operates via enhanced Mobile Broadband (eMBB), if the subcarrier spacing matches.

Figure 11:
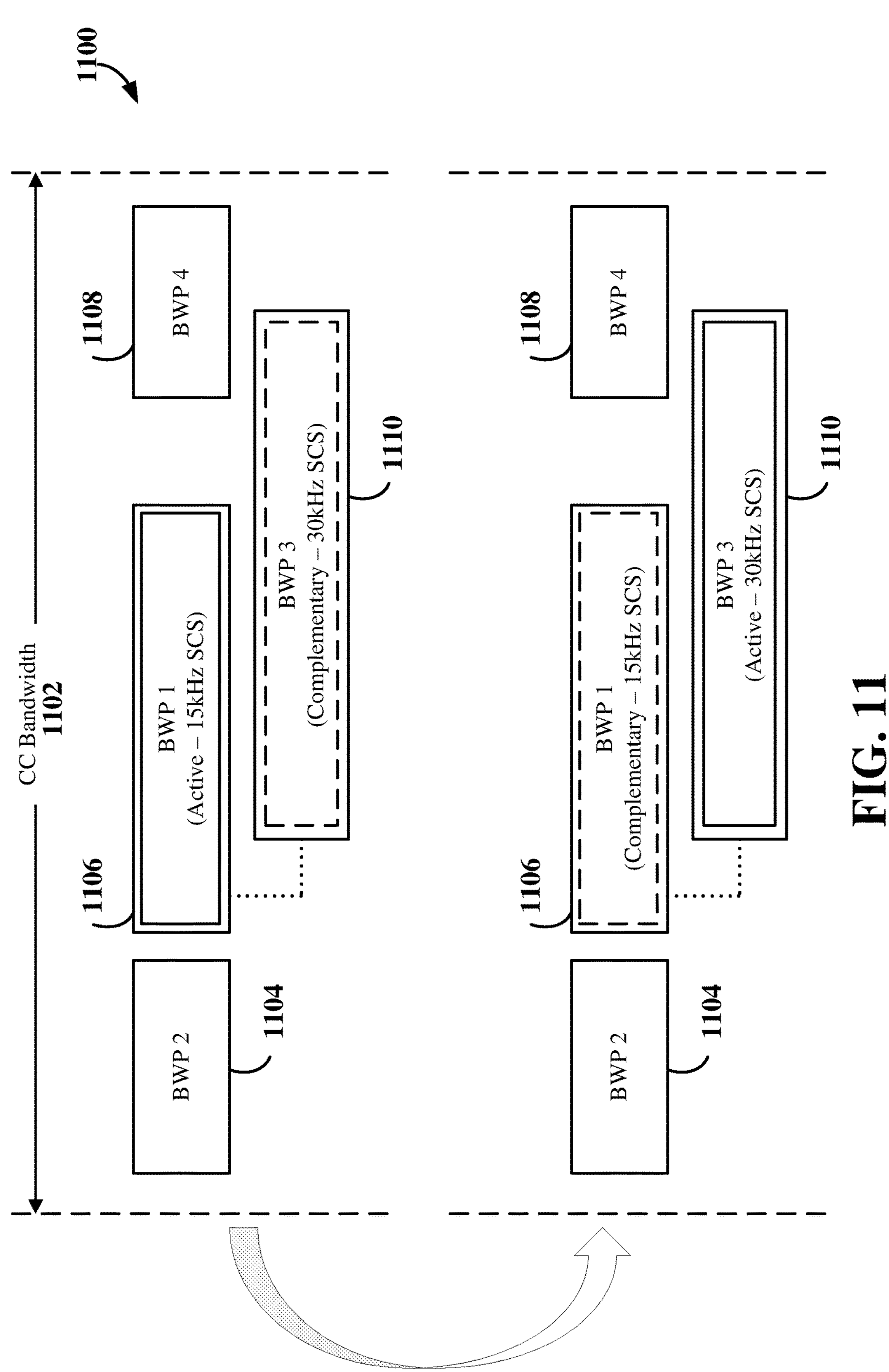
FIG. 11 is an illustration of a configuration showing the complementary BWP being selected as an active anchor BWP, and the previously active anchor BWP becoming the complementary BWP according to some aspects of the disclosure.

FIG. 11 is an illustration of a configuration 1100 showing the complementary BWP 1110 being selected as an active anchor BWP 1118, and the previously active anchor BWP 1106 becoming the complementary BWP 1114 according to some aspects of the disclosure. As discussed above, during operation, a UE may switch from an active anchor BWP to a complementary BWP based on characteristics such as slot format and/or signaling priority. Once the UE switches to the complementary BWP, the complementary BWP becomes active and is considered the "new" active anchor BWP. This is shown in FIG. 11, where, for a plurality of BWPs (1104-1110) of a CC bandwidth 1102, BWP 1106 is the active anchor BWP, and BWP 1110 is the complementary BWP.

In this example, once the UE switches to the complementary BWP 1100 (shown as arrow in the figure), the complementary BWP 1100 is subsequently configured as the new active anchor BWP, and the previously active anchor BWP 1106 is configured as the complementary BWP. Thus, under one configuration, the active BWP and the complementary BWP may, in effect, be "paired" with one another and the UE may switch back-and-forth between the two until a new condition, instruction, and/or operating environment causes the selection of a new active anchor BWP. By effectively pairing active anchor BWPs with complementary BWPs, this may ease processing requirements on the UE, since the UE should already have RF tuning information available for each BWP under normal operating conditions.

In some examples, the UE may utilize other configurations for managing switching between an active anchor BWP and a complementary BWP and vice versa. In some examples, when a UE receives an instruction (e.g., via gNB) to switch to the complementary BWP, the instructions may include an additional data indicating the new complementary BWP. This additional data may be received via DCI that includes extra bits (e.g., two extra bits) that point to the new complementary BWP. Alternately or in addition, the extra bits indicating an active anchor BWP in the DCI may also indicate the new complementary BWP in a joint manner that is RRC-configured. In some examples, RRC configuration may be used to configure a plurality of BWPs (e.g., four BWPs), where each BWP may be assigned an associated complementary BWP. For example, BWP 1110 may be designated a complementary BWP to BWP 1106, BWP 1104 may be designated a complementary BWP to BWP 1108, and so on.

During operation, after a complementary BWP is activated and functions as a new anchor BWP, the new complementary BWP does not need to be ready for operation contemporaneously with the switch, and may preferably be designated at a time subsequent to the switch, up to the legacy switching time period. If the UE switches a complementary BWP to a new active anchor BWP (e.g., 1110), the UE may be configured to maintain the previously active anchor BWP as a complementary BWP to the new active anchor BWP. Alternately or in addition, a new complementary BWP may be configured for the new active anchor BWP, as discussed previously above.

Figure 12:
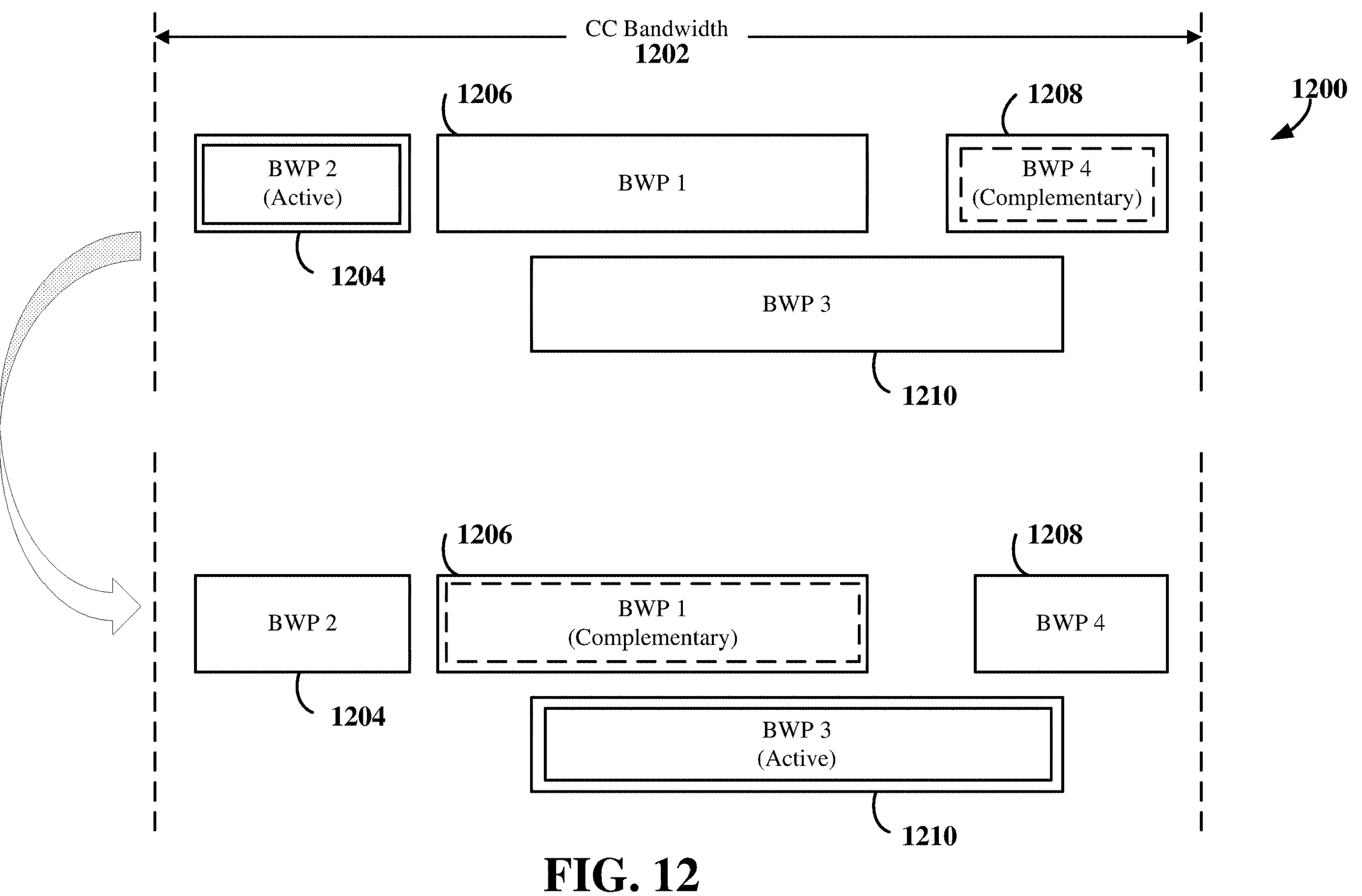
FIG. 12 is an illustration of a configuration showing a new active anchor BWP being selected and a new complementary BWP being selected according to some aspects of the disclosure.

FIG. 12 is an illustration 1200 of a configuration showing a new active anchor BWP being selected and a new complementary BWP being selected according to some aspects of the disclosure. In this example, a UE is configured with a plurality of BWPs (1204-1210) for a CC bandwidth 1202, where BWP 1204 is designated as an active anchor BWP and BWP 1208 is designated as a complementary BWP. In certain operating environments (e.g., via instructions from gNB), a UE may switch from an active anchor BWP to a non-complementary BWP. This is illustrated in FIG. 12 via the arrow, in which the UE switches to new active anchor BWP 1210 from the previously active anchor BWP 1204. In some examples, the UE may designate the existing complementary BWP to the new active anchor BWP. Alternately or in addition, the UE may switch the previous complementary BWP (e.g., 1208) to a new complementary BWP (e.g., 1206) associated with the new active anchor BWP (e.g., 1210) using RRC configuration. In another example, the UE may receive data indicating the new complementary BWP (e.g., 1206) that may be the same BWP, or a different BWP from the previous complementary BWP (e.g., 1208). The data indicating the new complementary BWP may be received via DCI, MAC-CE or RRC.

Figure 13:
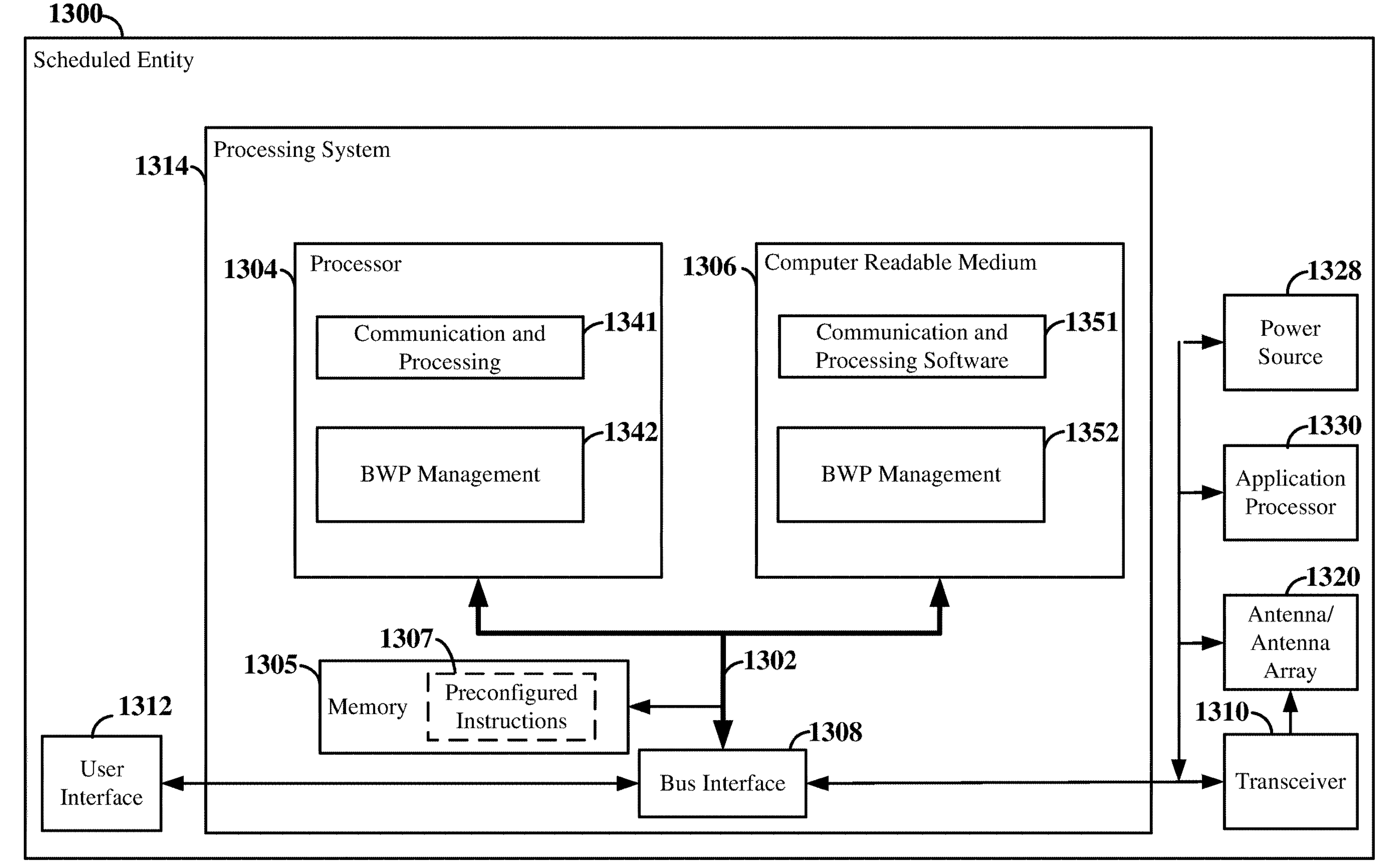
FIG. 13 is a block diagram illustrating an example of a hardware implementation of a scheduled entity employing a processing system according to some aspects of the disclosure.

FIG. 13 is a block diagram illustrating an example of a hardware implementation of a scheduled entity employing a processing system according to some aspects of the disclosure. For example, the scheduled entity 1300 may be a user equipment (UE) or other scheduled entity as illustrated in any one or more of FIGS. 1, 2, and/or 3.

In accordance with various aspects of the disclosure, an element, or any portion of an element, or any combination of elements may be implemented with a processing system 1314 that includes one or more processors, such as processor 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1300 may be configured to perform any one or more of the functions described herein. That is, the processor 1304, as utilized in a scheduled entity 1300, may be used to implement any one or more of the methods or processes described and illustrated herein.

The processor 1304 may in some instances be implemented via a baseband or modem chip and in other implementations, the processor 1304 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further.

A bus interface 1308 provides an interface between the bus 1302 and a transceiver 1310. The transceiver 1310 may be a wireless transceiver. The transceiver 1310 provides a means for communicating with various other apparatus over a transmission medium (e.g., air interface). The transceiver 1310 may further be coupled to one or more antennas/antenna array/antenna module 1320. The bus interface 1308 further provides an interface between the bus 1302 and a user interface 1312 (e.g., keypad, display, touch screen, speaker, microphone, control features, etc.). Of course, such a user interface 1312 is optional, and may be omitted in some examples. In addition, the bus interface 1308 further provides an interface between the bus 1302 and a power source 1328, and between the bus 1302 and an application processor 1330, which may be separate from a modem (not shown) of the scheduled entity 1300 or processing system 1314.

One or more processors, such as processor 1304, may be responsible for managing the bus 1302 and general processing, including the execution of software stored on the computer-readable medium 1306. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1306. The software, when executed by the processor 1304, causes the processing system 1314 to perform the various processes and functions described herein for any particular apparatus.

The computer-readable medium 1306 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product or article of manufacture. By way of example, a computer program product or article of manufacture may include a computer-readable medium in packaging materials. In some examples, the computer-readable medium 1306 may be part of the memory 1205. Those skilled in the art will recognize how best to implement the described functionality presented throughout this disclosure depending on the particular application and the overall design constraints imposed on the overall system. The computer-readable medium 1306 and/or the memory 1305 may also be used for storing data that is manipulated by the processor 1304 when executing software.

In some aspects of the disclosure, the processor 1304 may include communication and processing circuitry 1341 configured for various functions, including for example functionality for a means for communicating with a scheduling entity (e.g., a base station or other wireless communication device), a network core (e.g., a 5G core network), other scheduling entities, or any other entity, such as, for example, local infrastructure or an entity communicating with the scheduled entity 1300 via the Internet, such as a network provider. In some examples, the communication and processing circuitry 1341 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1341 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) via the antennas/antenna array/antenna module 1320 and the transceiver 1310. In some examples, the communication and processing circuitry 1341 may also be configured to transmit messages to the scheduling entity, indicating that a slot may be formatted with at least one downlink-uplink (DU) symbol reserved for downlink and uplink transmission at the same time at the same frequency. In some examples, the communication and processing circuitry 1341 may also be configured to receive and process a message from the scheduling entity, indicating a DU symbol or a DU slot interpretation that the scheduled entity may use to interpret a DU symbol or a DU slot In some implementations where the communication involves receiving information, the communication and processing circuitry 1341 may obtain information from a component of the wireless communication device 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1302. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving. In some examples, the communication and processing circuitry 1341 may include functionality for a means for processing, including a means for demodulating, a means for decoding, etc.

In some implementations where the communication involves sending (e.g., transmitting) information, the communication and processing circuitry 1341 may obtain information (e.g., from another component of the processor 1304, the memory 1305, or the bus interface 1302), process (e.g., modulate, encode, etc.) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., a means for transmitting). In some examples, the communication and processing circuitry 1341 may include functionality for a means for generating, including a means for modulating, a means for encoding, etc.

In some examples, the communication and processing circuitry 1341 may be configured to communicate (e.g., transmit/receive) beamformed signals at a mmWave frequency or a sub-6 GHz frequency via the transceiver 1310 and an antenna array (not shown).

In some aspects of the disclosure, the communication and processing circuitry 1341 may be configured for various functions, including, for example, obtaining a duplex mode from a scheduling entity (e.g., a base station) in wireless communication with the scheduled entity. The duplex mode may be, for example full duplex, half-duplex, or full duplex-aware. The communication and processing circuitry 1341 may further be configured to execute communication and processing instructions (software) 1351 stored on the computer-readable medium 1306 to implement one or more of the functions described herein.

In some aspects of the disclosure, the processor 1304 may include BWP management circuitry 1342 configured for various functions, including, for example, determining an active anchor BWP and determining associated complementary BWP, as discussed above. The complementary BWP may be determined by the scheduled entity 1300 using, for example, slot formats and/or signaling priorities. Alternately or in addition, the BWP management circuitry 1342 may receive and process BWP data provided on the bus interface 1302 via transceiver 1310 (e.g., received from a scheduling entity) and/or preconfigured instructions 1307 of memory 1305, for example, if the scheduled entity is either a HD or a FD-aware scheduled entity. BWP management circuitry 1342 may be configured to continuously select and/or reselect active anchor BWPs and/or complementary BWPs during operation. The BWP management circuitry 1342 may further be configured to execute BWP management instructions (software) 1352 stored on the computer-readable medium 1306 to implement one or more of the functions described herein.

Figure 14:
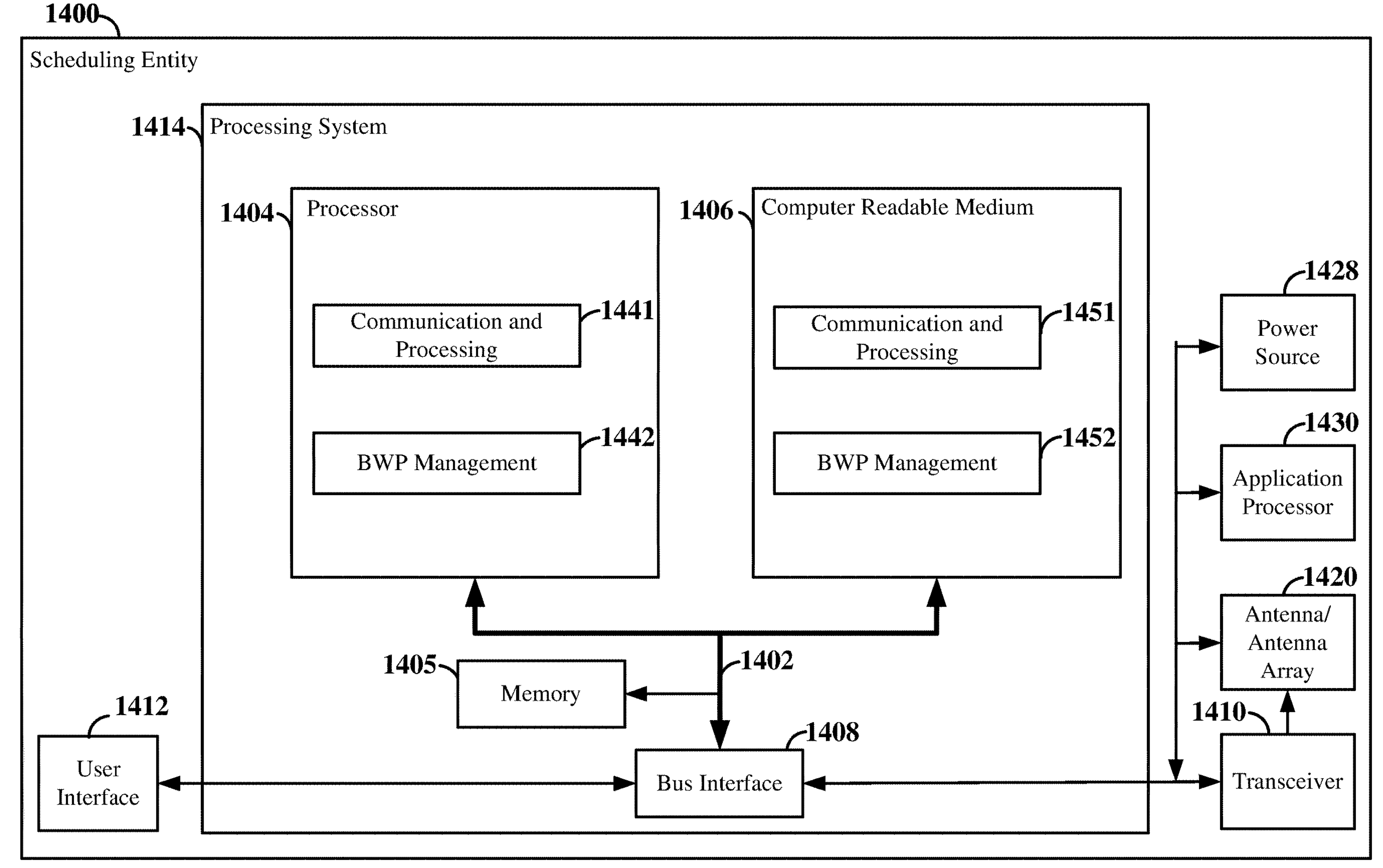
FIG. 14 is a block diagram illustrating an example of a hardware implementation of a scheduling entity employing a processing system according to some aspects of the disclosure.

FIG. 14 is a block diagram illustrating an example of a hardware implementation of a scheduling entity employing a processing system according to some aspects of the disclosure. The scheduling entity 1400 may be, for example, a base station, an eNB, a gNB, or a network access node as illustrated in any one or more of FIGS. 1, 2, and/or 3.

The processing system 1414 may be substantially the same as the processing system 1314 illustrated in FIG. 13, including a bus interface 1408, a bus 1402, memory 1405, a processor 1404, and a computer-readable medium 1406. In accordance with various aspects of the disclosure, an element, or any portion of an element, or any combination of elements may be implemented with a processing system 1414 that includes one or more processors, such as processor 1404. Furthermore, the scheduled entity 1400 may include a user interface 1412, a transceiver 1410, an antenna/antenna array/antenna module 1420, an application processor 1430, and a power source 1428 substantially similar to those described above in FIG. 13. That is, the processor 1404, as utilized in a scheduled entity 1400, may be used to implement any one or more of the processes described herein. The transceiver 1410 may be a wireless transceiver.

In some aspects of the disclosure, the processor 1404 may include communication and processing circuitry 1441, which may be similarly configured as communication and processing circuitry 1341, discussed above in connection with FIG. 13. In some examples, communication and processing circuitry 1441 may be configured for various functions, including for example communicating with a scheduled entity (e.g., UE), a network core (e.g., a 5G core network), other scheduled entities, or any other entity, such as, for example, local infrastructure or an entity communicating with the scheduling entity 1400 via the Internet, such as a network provider. In some examples, the communication and processing circuitry 1441 may also be configured to transmit a message to the scheduled entity, indicating that a slot may be formatted with at least one downlink-uplink (DU) symbol reserved for downlink and uplink transmission at the same time at the same frequency. In some examples, the communication and processing circuitry 1441 may also be configured to transmit a message to the scheduled entity, indicating a DU symbol or a DU slot interpretation that the scheduled entity may use to interpret a DU symbol or a DU slot. In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1441 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 1441 may further be configured to execute communication and processing instructions (software) 1451 stored on the computer-readable medium 1406 to implement one or more of the functions described herein.

In some aspects of the disclosure, the processor 1404 may include BWP management circuitry 1442 configured for various functions, including, for example, functionality for determining an active anchor BWP and configuring associated complementary BWP(s), as discussed above. The complementary BWP may be determined by the scheduling entity 1400 using, for example, slot formats and/or signaling priorities. Alternately or in addition, the BWP management circuitry 1442 may transmit BWP data via transceiver 1410 to a scheduled entity (e.g., 1300). BWP management circuitry 1442 may be configured to continuously select and/or reselect active anchor BWPs and/or complementary BWPs for a scheduled entity during operation. The BWP management circuitry 1442 may further be configured to execute BWP management instructions (software) 1452 stored on the computer-readable medium 1406 to implement one or more of the functions described herein.

Figure 15:
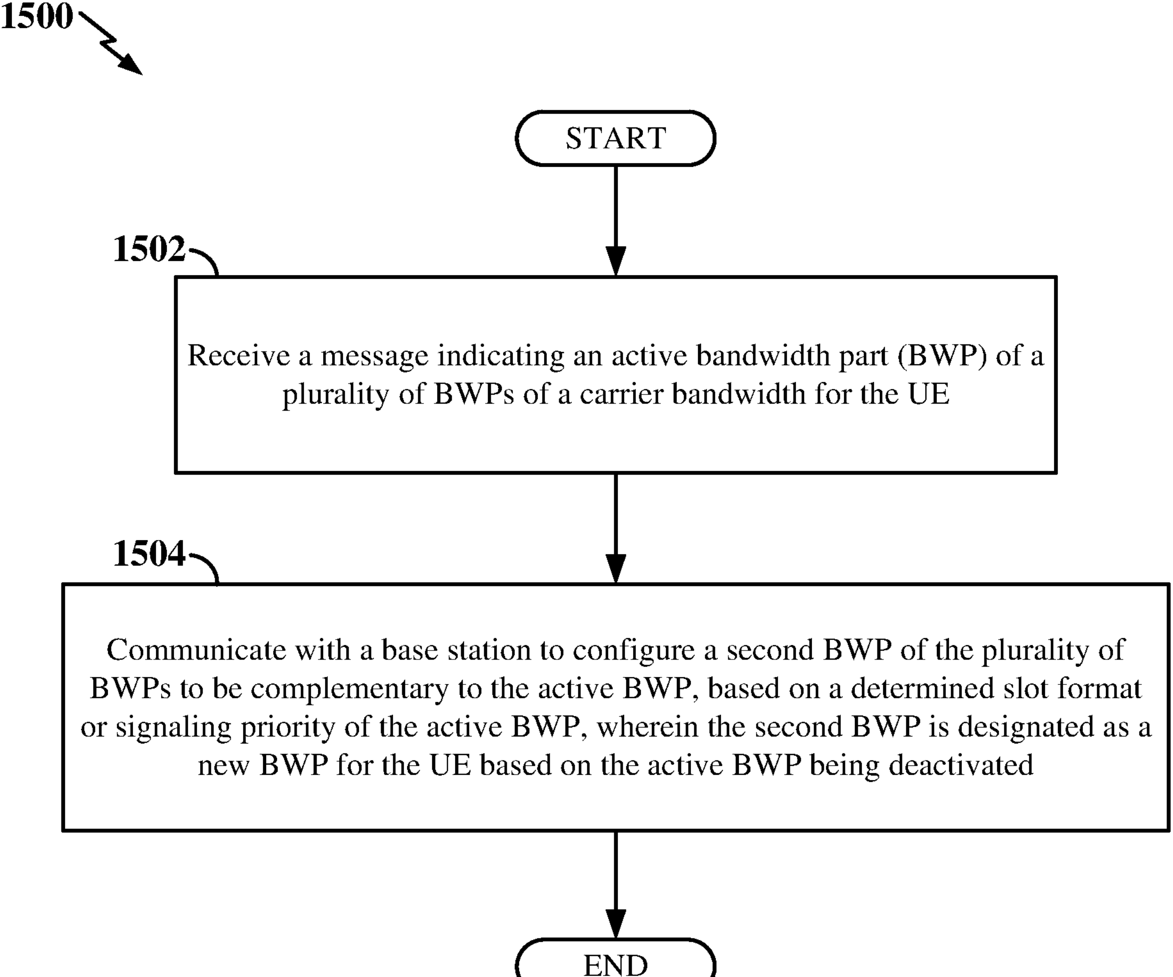
FIG. 15 is a method for BWP management for designating an active anchor BWP and a complementary BWP in a scheduled entity (e.g., UE) under some aspects of the disclosure.

FIG. 15 is a method 1500 for BWP management for designating an active anchor BWP and a complementary BWP in a scheduled entity (e.g., UE) under some aspects of the disclosure. As described below, some or all illustrated features may be omitted in a particular implementation within the scope of the present disclosure, and some illustrated features may not be required for implementation of all examples. In some examples, the method 1500 may be carried out by the scheduled entity 1300 illustrated in FIG. 13. In some examples, the method 1500 may be carried out by any suitable apparatus or means for carrying out the functions or algorithms described below.

In block 1502, the scheduled entity (e.g., UE) may receive a message indicating an active bandwidth part (BWP) (e.g., 1106) of a plurality of BWPs of a carrier bandwidth for the UE. For example, the transceiver 1310 and communication and processing circuitry 1341 shown and described in connection with FIG. 13 may provide a means for receiving a message indicating an active bandwidth part (BWP) of a plurality of BWPs of a carrier bandwidth for the UE.

In block 1504, the scheduled entity may communicate with a base station to configure a second BWP (e.g., 1110) of the plurality of BWPs to be complementary to the active BWP, based on a determined slot format or signaling priority of the active BWP, wherein the second BWP is designated as a new BWP for the UE based on the active BWP being deactivated. In some examples, the slot format includes at least one of a half-duplex slot or a full-duplex slot. The signaling priority may include at least one of low-priority signaling and high-priority signaling. For example, the communications and processing circuitry 1341 and BWP management circuitry 1342 shown and described in connection with FIG. 13 may provide a means for communicating with a base station to configure a second BWP of the plurality of BWPs to be complementary to the active BWP, based on a determined slot format or signaling priority of the active BWP, wherein the second BWP is designated as a new BWP for the UE when the active BWP is deactivated.

In some examples, the second BWP has at least a partially overlapping bandwidth with the activated BWP. In some examples, configuring the second BWP may include performing radio frequency (RF) tuning on the activated BWP and the second BWP. The second BWP may include different/larger sub-carrier spacing from the activated BWP. In some examples, the second BWP may be activated when the activated BWP is deactivated during an ultra-reliable low latency communication (URLLC) operating mode. The second BWP may be deactivated and the activated BWP may be reactivated during an enhanced mobile broadband (eMBB) operating mode. The second BWP may be activated when the activated BWP is deactivated, during a UE transition from a half-duplex slot to a full-duplex slot.

In some examples, configuring the second BWP (e.g., 1110) to be complementary to the activated BWP (e.g., 1106) may include modifying one or more bits in a second BWP configuration to indicate that the second BWP is complementary, or modifying a BWP index associated with the activated BWP to indicate that the second BWP is complementary. The second BWP may be activated when the activated BWP is deactivated, and the activated BWP may be configured to be complementary to the second BWP. In some examples, the second BWP may be activated when the activated BWP is deactivated, and downlink control information (DCI) may be received indicating another BWP of the plurality of BWPs that is complementary to the second BWP. In some examples, the second BWP may be activated when the activated BWP is deactivated, and radio resource control (RRC) data may be received indicating another BWP of the plurality of BWPs that is complementary to the second BWP.

In some examples, a third BWP (e.g., 1210) of the plurality of BWPs may be activated when the activated BWP (e.g., 1204) is deactivated, and the second BWP may be configured to be complementary to the third BWP, based on the determined slot format or signaling priority, wherein the second BWP is designated as the BWP the UE will switch to when the third BWP is deactivated. In some examples, when the third BWP (e.g., 1210) of the plurality of BWPs is activated when the activated BWP is deactivated, a fourth BWP (e.g., 1206) may be configured to be complementary to the third BWP, based on the determined slot format or signaling priority, wherein the fourth BWP may be designated as the BWP the UE will switch to when the third BWP is deactivated. In some examples, when the third BWP of the plurality of BWPs is activated when the activated BWP is deactivated, data may be received indicating one of the plurality of BWPs to be complementary to the third BWP, wherein the indicated one BWP is designated as the BWP the UE will switch to when the third BWP is deactivated. In some examples, receiving the data indicating one of the plurality of BWPs to be complementary may include receiving data via one of downlink control information (DCI), MAC control element (MAC-CE) or radio resource control (RRC) transmission. For example, the BWP management circuitry 1342 shown and described in connection with FIG. 13 may provide a means for activating/deactivating, designating and/or configuring the BWPs to be complementary to respective BWPs.

Figure 16:
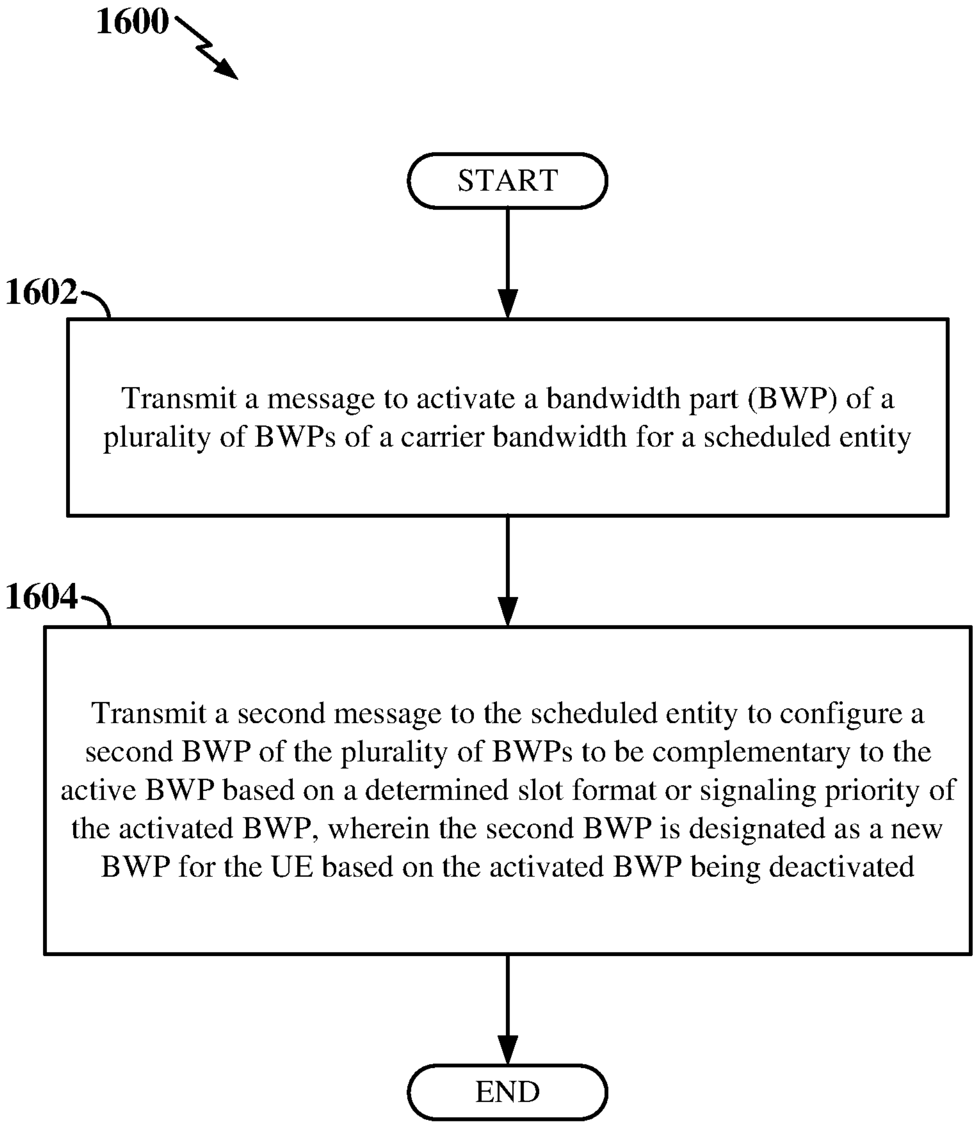
FIG. 16 is a method for BWP management for designating an active anchor BWP and a complementary BWP in a scheduling entity (e.g., base station) under some aspects of the disclosure.

FIG. 16 is a method for BWP management for designating an active anchor BWP and a complementary BWP in a scheduling entity (e.g., base station) under some aspects of the disclosure. As described below, some or all illustrated features may be omitted in a particular implementation within the scope of the present disclosure, and some illustrated features may not be required for implementation of all examples. In some examples, the method 1600 may be carried out by the scheduling entity 1400 illustrated in FIG. 14. In some examples, the method 1600 may be carried out by any suitable apparatus or means for carrying out the functions or algorithms described below.

In block 1602, the scheduling entity (e.g., a base station, such as a gNB) may transmit a message to activate a bandwidth part (BWP) of a plurality of BWPs of a carrier bandwidth for a scheduled entity. For example, the transceiver 1410, communications and processing circuitry 1441 and BWP management circuitry 1442 shown and described in connection with FIG. 14 may provide a means for transmitting a message to activate a bandwidth part (BWP) of a plurality of BWPs of a carrier bandwidth for a scheduled entity.

In block 1604, the scheduling entity may transmit a second message to the scheduled entity to configure a second BWP of the plurality of BWPs to be complementary to the active BWP based on a determined slot format or signaling priority of the activated BWP, wherein the second BWP is designated as a new BWP for the UE based on the activated BWP being deactivated. For example, the transceiver 1410, communications and processing circuitry 1441 and BWP management circuitry 1442 shown and described in connection with FIG. 14 may provide a means for transmitting determining slot format or signaling priority of the activated BWP.

In some examples, the second BWP has at least a partially overlapping bandwidth with the activated BWP. The second BWP may also include a larger sub-carrier spacing from the activated BWP. In some examples, the second BWP may be configured to be activated when the activated BWP is deactivated during an ultra-reliable low latency communication (URLLC) operating mode. In some examples, the slot format may include at least one of a half-duplex and full-duplex slot, and wherein the second BWP is configured to be activated when the activated BWP is deactivated, during a transition from a half-duplex to a full-duplex slot.

In some examples, the second BWP may be configured to be complementary to the activated BWP by a modified one or more bits in the second BWP configuration to indicate that the second BWP is complementary, or a modified BWP index associated with the activated BWP to indicate that the second BWP is complementary. In some examples, the second BWP may be configured to be activated when the activated BWP is deactivated, and the activated BWP may be configured to be complementary to the second BWP. In some examples, the second BWP may be activated when the activated BWP is deactivated, and downlink control information (DCI) may be transmitted indicating another BWP of the plurality of BWPs that is complementary to the second BWP, or radio resource control (RRC) data may be transmitted indicating another BWP of the plurality of BWPs that is complementary to the second BWP.

In some examples, a message may be transmitted to activate a third BWP of the plurality of BWPs when the activated BWP is deactivated, wherein the second BWP may be configured to be complementary to the third BWP, based on the determined slot format or signaling priority, wherein the second BWP is designated as the BWP the UE will switch to when the third BWP is deactivated, a fourth BWP may be configured to be complementary to the third BWP, based on the determined slot format or signaling priority, wherein the fourth BWP is designated as the BWP the UE will switch to when the third BWP is deactivated, or data may be transmitted indicating one of the plurality of BWPs to be complementary to the third BWP, wherein the indicated one BWP is designated as the BWP the UE will switch to when the third BWP is deactivated.

Figure 17:
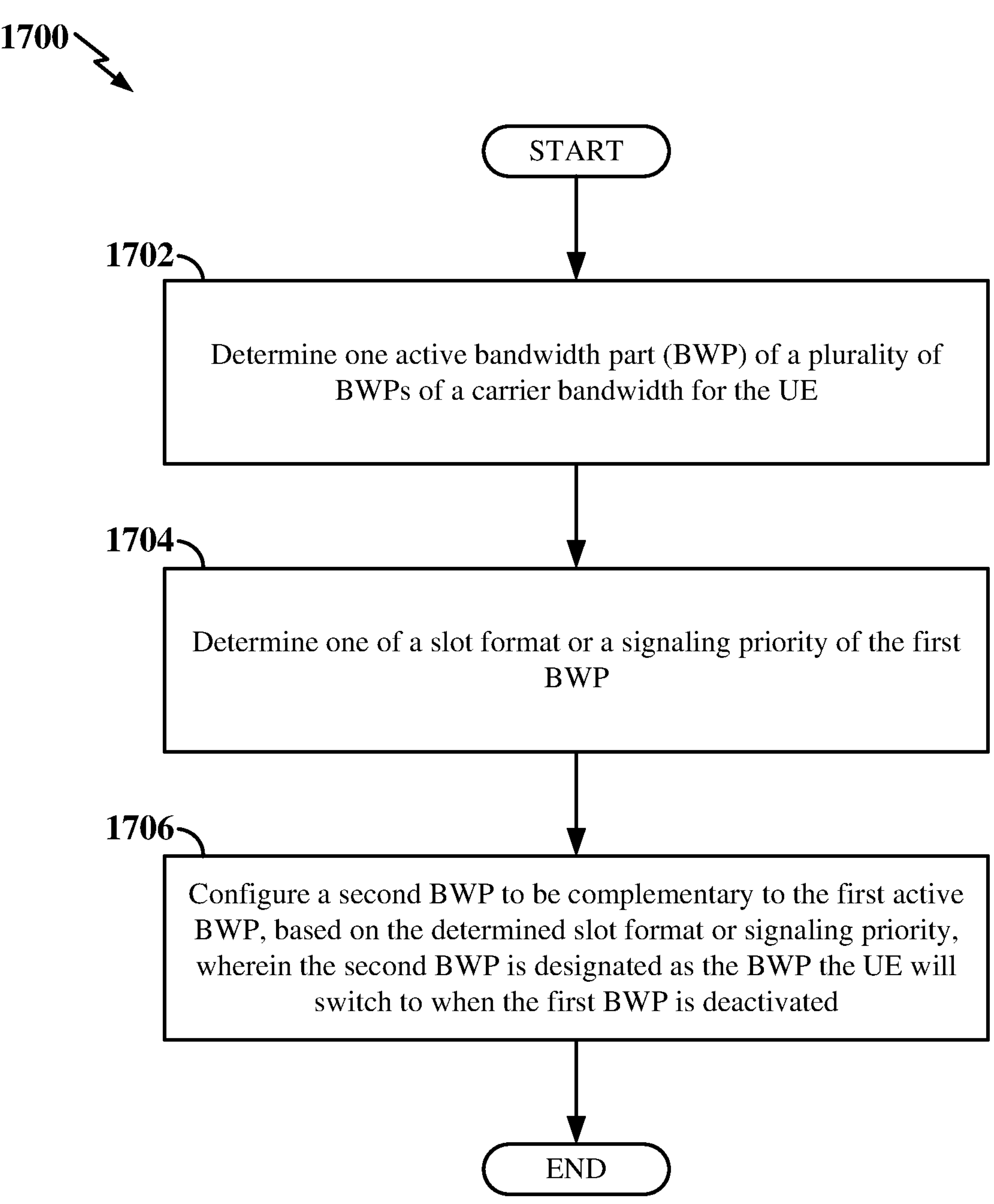
FIG. 17 is another method for BWP management for designating an active anchor BWP and a complementary BWP in a scheduled entity (e.g., UE) under some aspects of the disclosure.

FIG. 17 is a method 1700 for BWP management for designating an active anchor BWP and a complementary BWP in a scheduled entity (e.g., UE) under some aspects of the disclosure. As described below, some or all illustrated features may be omitted in a particular implementation within the scope of the present disclosure, and some illustrated features may not be required for implementation of all examples. In some examples, the method 1700 may be carried out by the scheduled entity 1300 illustrated in FIG. 13. In some examples, the method 1700 may be carried out by any suitable apparatus or means for carrying out the functions or algorithms described below.

In block 1702, the scheduled entity (e.g., UE) may activate a bandwidth part (BWP) of a plurality of BWPs of a carrier bandwidth for the UE (e.g., 1106, 1204). For example, the communication and processing circuitry 1341 and BWP management circuitry 1342 shown and described in connection with FIG. 13 may provide a means for activating.

In block 1704, the scheduled entity may determine one of a slot format or a signaling priority of the activated BWP. In some examples, the slot format includes at least one of a half-duplex slot or a full-duplex slot. The signaling priority may include at least one of low-priority signaling and high-priority signaling. For example, the BWP management circuitry 1342 shown and described in connection with FIG. 13 may provide a means for determining one of a slot format or a signaling priority of the activated BWP.

In block 1706, the scheduled entity may configure a second BWP to be complementary to the activated BWP (e.g., 1110), based on the determined slot format or signaling priority, wherein the second BWP is designated as the BWP the UE will switch to when the activated BWP (e.g., 1106) is deactivated. For example, the BWP management circuitry 1342 shown and described in connection with FIG. 13 may provide a means for configuring the second BWP to be complementary to the activated BWP. In some examples, the second BWP has at least a partially overlapping bandwidth with the activated BWP. In some examples, configuring the second BWP may include performing radio frequency (RF) tuning on the activated BWP and the second BWP. The second BWP may include different/larger sub-carrier spacing from the activated BWP. In some examples, the second BWP may be activated when the activated BWP is deactivated during an ultra-reliable low latency communication (URLLC) operating mode. The second BWP may be deactivated and the activated BWP may be reactivated during an enhanced mobile broadband (eMBB) operating mode. The second BWP may be activated when the activated BWP is deactivated, during a UE transition from a half-duplex slot to a full-duplex slot.

In some examples, configuring the second BWP (e.g., 1110) to be complementary to the activated BWP (e.g., 1106) may include modifying one or more bits in a second BWP configuration to indicate that the second BWP is complementary, or modifying a BWP index associated with the activated BWP to indicate that the second BWP is complementary. The second BWP may be activated when the activated BWP is deactivated, and the activated BWP may be configured to be complementary to the second BWP. In some examples, the second BWP may be activated when the activated BWP is deactivated, and downlink control information (DCI) may be received indicating another BWP of the plurality of BWPs that is complementary to the second BWP. In some examples, the second BWP may be activated when the activated BWP is deactivated, and radio resource control (RRC) data may be received indicating another BWP of the plurality of BWPs that is complementary to the second BWP.

In some examples, a third BWP of the plurality of BWPs (e.g., 1210) may be activated when the activated BWP (e.g., 1204) is deactivated, and the second BWP may be configured to be complementary to the third BWP, based on the determined slot format or signaling priority, wherein the second BWP is designated as the BWP the UE will switch to when the third BWP is deactivated. In some examples, when the third BWP (e.g., 1210) of the plurality of BWPs is activated when the activated BWP is deactivated, a fourth BWP (e.g., 1206) may be configured to be complementary to the third BWP, based on the determined slot format or signaling priority, wherein the fourth BWP may be designated as the BWP the UE will switch to when the third BWP is deactivated. In some examples, when the third BWP of the plurality of BWPs is activated when the activated BWP is deactivated, data may be received indicating one of the plurality of BWPs to be complementary to the third BWP, wherein the indicated one BWP is designated as the BWP the UE will switch to when the third BWP is deactivated. In some examples, receiving the data indicating one of the plurality of BWPs to be complementary may include receiving data via one of downlink control information (DCI), MAC control element (MAC-CE) or radio resource control (RRC) transmission. For example, the BWP management circuitry 1342 shown and described in connection with FIG. 13 may provide a means for activating/deactivating, designating and/or configuring the BWPs to be complementary to respective BWPs.

Figure 18:
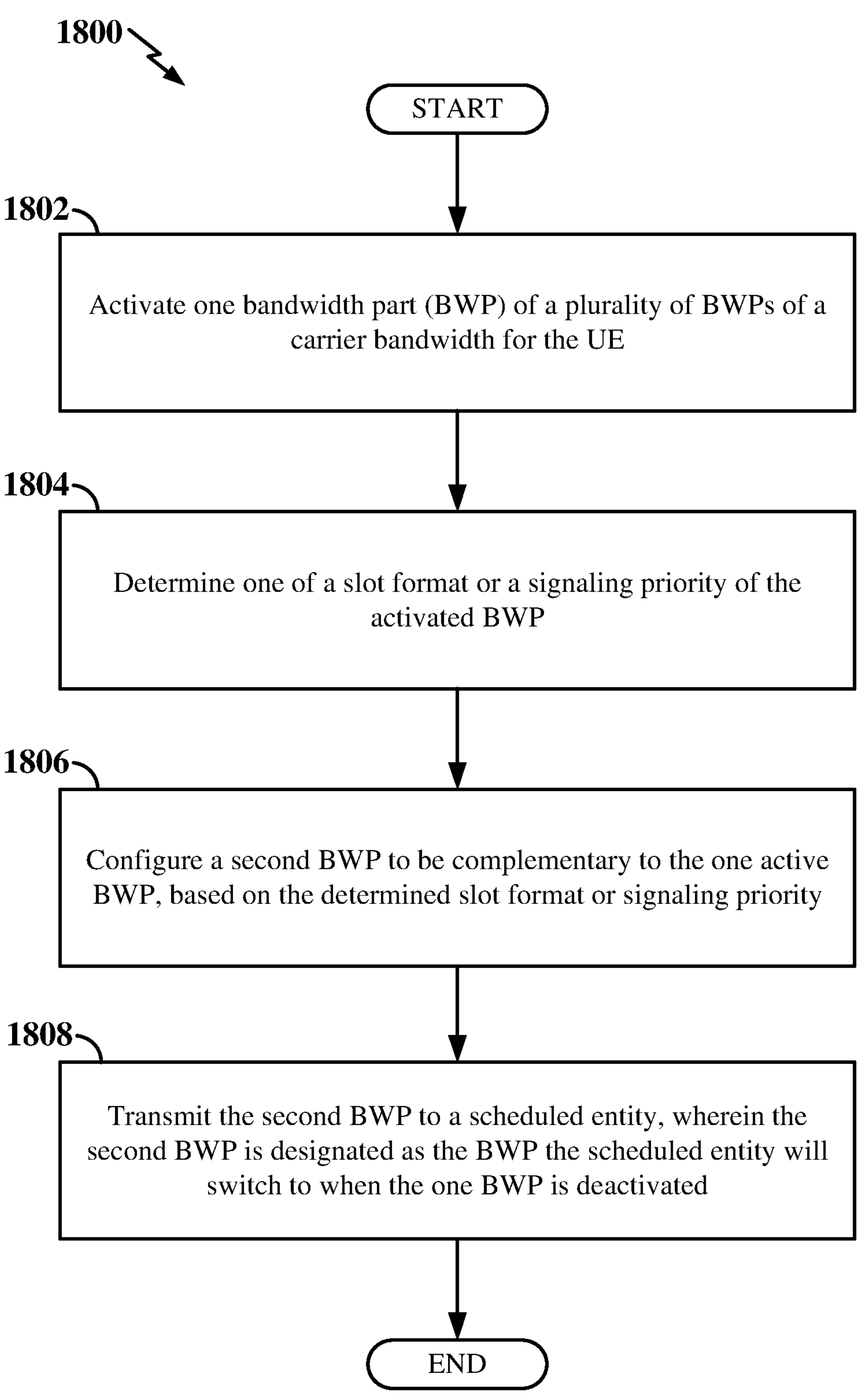
FIG. 18 is another method for BWP management for designating an active anchor BWP and a complementary BWP in a scheduling entity (e.g., base station) under some aspects of the disclosure.

FIG. 18 is a method for BWP management for designating an active anchor BWP and a complementary BWP in a scheduling entity (e.g., base station) under some aspects of the disclosure. As described below, some or all illustrated features may be omitted in a particular implementation within the scope of the present disclosure, and some illustrated features may not be required for implementation of all examples. In some examples, the method 1800 may be carried out by the scheduling entity 1400 illustrated in FIG. 14. In some examples, the method 1800 may be carried out by any suitable apparatus or means for carrying out the functions or algorithms described below.

In block 1802, the scheduling entity (e.g., a base station, such as a gNB) may active one bandwidth part (BWP) of a plurality of BWPs of a carrier bandwidth for a scheduled entity (e.g., a UE). For example, the communication and processing circuitry 1441 and BWP management circuitry 1442 shown and described in connection with FIG. 14 may provide a means for activating a BWP of a plurality of BWPs of a carrier bandwidth for a scheduled entity.

In block 1804, one of a slot format or a signaling priority of the activated BWP is determined. In some examples, the slot format includes at least one of a half-duplex and full-duplex slot. For example, the BWP management circuitry 1442 shown and described in connection with FIG. 14 may provide a means for determining a slot format or a signal priority.

In block 1806, a second BWP to be complementary to the activated BWP is configured, based on the determined slot format or signaling priority. In some examples, the second BWP has at least a partially overlapping bandwidth with the activated BWP. The second BWP may include a larger sub-carrier spacing from the activated BWP. In some examples, the second BWP may be activated when the activated BWP is deactivated during an ultra-reliable low latency communication (URLLC) operating mode. The second BWP may be activated when the activated BWP is deactivated, during a transition from a half-duplex to a full-duplex slot. In some examples, the second BWP may be configured to be complementary to the activated BWP by modifying one or more bits in the second BWP configuration to indicate that the second BWP is complementary, or modifying a BWP index associated with the activated BWP to indicate that the second BWP is complementary. For example, the communication and processing circuitry 1441 and BWP management circuitry 1442 shown and described in connection with FIG. 14 may provide a means for configuring a second BWP to be complementary to the activated BWP.

In block 1808, the second BWP is transmitted to the scheduled entity wherein the second BWP is designated as the BWP the UE will switch to when the activated BWP is deactivated. In some examples, the second BWP may be configured to activate when the activated BWP is deactivated, and the activated BWP may be configured to be complementary to the second BWP. In some examples, the second BWP may be configured to be activated when the activated BWP is deactivated, and downlink control information (DCI) may be transmitted, indicating another BWP of the plurality of BWPs that is complementary to the second BWP, or radio resource control (RRC) data may be transmitted indicating another BWP of the plurality of BWPs that is complementary to the second BWP. For example, the communication and processing circuitry 1441, BWP management circuitry 1442 and transceiver 1410 shown and described in connection with FIG. 14 may provide a means for transmitting the second BWP to the scheduled entity wherein the second BWP is designated as the BWP the UE will switch to when the activated BWP is deactivated.

In some examples, a third BWP of the plurality of BWPs may be activated when the activated BWP is deactivated, and the second BWP may be configured to be complementary to the third BWP, based on the determined slot format or signaling priority, wherein the second BWP is designated as the BWP the UE will switch to when the third BWP is deactivated, a fourth BWP may be configured to be complementary to the third BWP, based on the determined slot format or signaling priority, wherein the fourth BWP is designated as the BWP the UE will switch to when the third BWP is deactivated, or data indicating one of the plurality of BWPs to be complementary is transmitted to the third BWP, wherein the indicated one BWP is designated as the BWP the UE will switch to when the third BWP is deactivated.

Of course, in the above examples, the circuitry included in the processors is merely provided as an example, and other means for carrying out the described functions may be included within various aspects of the present disclosure, including but not limited to the instructions stored in computer-readable medium, or any other suitable apparatus or means described in any one of the FIGS. 1, 2, and/or 3, and utilizing, for example, the processes and/or algorithms described herein in relation to FIGS. 8-12 and 15-16.

The following provides an overview of examples of the present disclosure.

Example 1: A method of full duplex communication in a user equipment (UE), comprising: receiving a message indicating an active bandwidth part (BWP) of a plurality of BWPs of a carrier bandwidth for the UE; and communicating with a base station to configure a second BWP of the plurality of BWPs to be complementary to the active BWP, based on a determined slot format or signaling priority of the active BWP, wherein the second BWP is designated as a new BWP for the UE based on the active BWP being deactivated.

Example 2: The method of example 1, wherein the second BWP has at least a partially overlapping bandwidth with the activated BWP.

Example 3: The method of example 1 and/or 2, wherein the configuring the second BWP comprises performing radio frequency (RF) tuning on the activated BWP and the second BWP.

Example 4: The method of any of examples 1 through 3, wherein the second BWP comprises different sub-carrier spacing from the activated BWP.

Example 5: The method of any of examples 1 through 4, wherein the second BWP comprises a larger sub-carrier spacing from the activated BWP.

Example 6: The method of any of examples 1 through 5, wherein the second BWP is activated when the activated BWP is deactivated during an ultra-reliable low latency communication (URLLC) operating mode.

Example 7: The method of any of examples 1 through 6, further comprising deactivating the second BWP and reactivating the activated BWP during an enhanced mobile broadband (eMBB) operating mode.

Example 8: The method of any of examples 1 through 7, wherein the slot format comprises at least one of a half-duplex slot or a full-duplex slot.

Example 9: The method of any of examples 1 through 8, further comprising communicating with a base station to configure a second BWP to activate when the activated BWP is deactivated, during a UE transition from a half-duplex slot to a full-duplex slot.

Example 10: The method of any of examples 1 through 9, wherein the signaling priority comprises at least one of low-priority signaling and high-priority signaling.

Example 11: The method of any of examples 1 through 10, wherein the configuring the second BWP to be complementary to the activated BWP comprises modifying one or more bits in a second BWP configuration to indicate that the second BWP is complementary.

Example 12: The method of any of examples 1 through 11, wherein the configuring the second BWP to be complementary to the activated BWP comprises modifying a BWP index associated with the activated BWP to indicate that the second BWP is complementary.

Example 13: The method of any of examples 1 through 12, further comprising activating the second BWP when the activated BWP is deactivated, and configuring the activated BWP to be complementary to the second BWP.

Example 14: The method of any of examples 1 through 13, further comprising activating the second BWP when the activated BWP is deactivated, and receiving downlink control information (DCI) indicating another BWP of the plurality of BWPs that is complementary to the second BWP.

Example 15: The method of any of examples 1 through 14, further comprising activating the second BWP when the activated BWP is deactivated, and receiving radio resource control (RRC) data indicating another BWP of the plurality of BWPs that is complementary to the second BWP.

Example 16: The method of any of examples 1 through 15, further comprising activating a third BWP of the plurality of BWPs when the activated BWP is deactivated, and configuring the second BWP to be complementary to the third BWP, based on the determined slot format or signaling priority, wherein the second BWP is designated as the BWP the UE will switch to when the third BWP is deactivated.

Example 17: The method of any of examples 1 through 16, further comprising activating a third BWP of the plurality of BWPs when the activated BWP is deactivated, and configuring a fourth BWP to be complementary to the third BWP, based on the determined slot format or signaling priority, wherein the fourth BWP is designated as the BWP the UE will switch to when the third BWP is deactivated.

Example 18: The method of any of examples 1 through 17, further comprising activating a third BWP of the plurality of BWPs when the activated BWP is deactivated, and receiving data indicating one of the plurality of BWPs to be complementary to the third BWP, wherein the indicated one BWP is designated as the BWP the UE will switch to when the third BWP is deactivated.

Example 19: The method of any of examples 1 through 18, wherein receiving the data indicating one of the plurality of BWPs to be complementary comprising receiving data via one of downlink control information (DCI), MAC control element (MAC-CE) or radio resource control (RRC) transmission.

Example 20: A scheduled entity in a wireless communication network, comprising: a wireless transceiver; a memory; and a processor communicatively coupled to the wireless transceiver and the memory, wherein the processor and the memory are configured to perform a method of any of the examples 1 through 19.

Example 21: An apparatus configured for wireless communication comprising means for performing a method of any one of examples 1 through 19.

Example 22: A non-transitory computer-readable medium having stored therein instructions executable by one or more processors of a wireless communication device in a wireless communication network to perform a method of any one of examples 1 through 19.

Example 23: A method of full duplex communication in a scheduling entity, comprising: transmitting a first message indicating an active bandwidth part (BWP) of a plurality of BWPs of a carrier bandwidth for a scheduled entity; and transmitting a second message to the scheduled entity to configure a second BWP of the plurality of BWPs to be complementary to the active BWP based on a determined slot format or signaling priority of the activated BWP, wherein the second BWP is designated as a new BWP for the UE based on the activated BWP being deactivated.

Example 24: The method of example 23, wherein the second BWP is configured with an at least a partially overlapping bandwidth with the activated BWP.

Example 25: The method of example 23 and/or 24, wherein the configuring the second BWP comprises processing data relating to radio frequency (RF) tuning on the activated BWP and second BWP.

Example 26: The method of any of examples 23 through 25, wherein the second BWP comprises different sub-carrier spacing from the activated BWP.

Example 27: The method of any of examples 23 through 26, wherein the second BWP comprises a larger sub-carrier spacing from the activated BWP.

Example 28: The method of any of examples 23 through 27, wherein the second BWP is configured to be activated when the activated BWP is deactivated during an ultra-reliable low latency communication (URLLC) operating mode.

Example 29: The method of any of examples 23 through 28, further comprising configuring the second BWP to be deactivated and reactivating the activated BWP during an enhanced mobile broadband (eMBB) operating mode.

Example 30: The method of any of examples 23 through 29, wherein the slot format comprises at least one of a half-duplex and full-duplex slot.

Example 31: The method of any of examples 23 through 30, further comprising configuring the second BWP to be activated when the activated BWP is deactivated, during a transition from a half-duplex to a full-duplex slot.

Example 32: The method of any of examples 23 through 31, wherein the signaling priority comprises at least one of low-priority signaling and high-priority signaling.

Example 33: The method of any of examples 23 through 32, wherein configuring the second BWP to be complementary to the activated BWP comprises modifying one or more bits in the second BWP configuration to indicate that the second BWP is complementary.

Example 34: The method of any of examples 23 through 33, wherein configuring the second BWP to be complementary to the activated BWP comprises modifying a BWP index associated with the activated BWP to indicate that the second BWP is complementary.

Example 35: The method of any of examples 23 through 34, further comprising configuring the second BWP to be activated when the activated BWP is deactivated, and configuring the activated BWP to be complementary to the second BWP.

Example 36: The method of any of examples 23 through 35, further comprising configuring the second BWP to be activated when the activated BWP is deactivated, and transmitting downlink control information (DCI) indicating another BWP of the plurality of BWPs that is complementary to the second BWP.

Example 37: The method of any of examples 23 through 36, further comprising configuring the second BWP to be activated when the activated BWP is deactivated, and transmitting radio resource control (RRC) data indicating another BWP of the plurality of BWPs that is complementary to the second BWP.

Example 38: The method of any of examples 23 through 37, further comprising configuring a third BWP of the plurality of BWPs to be activated when the activated BWP is deactivated, and configuring the second BWP to be complementary to the third BWP, based on the determined slot format or signaling priority, wherein the second BWP is designated as the BWP the UE will switch to when the third BWP is deactivated.

Example 39: The method of any of examples 23 through 38, further comprising configuring a third BWP of the plurality of BWPs to be activated when the activated BWP is deactivated, and configuring a fourth BWP to be complementary to the third BWP, based on the determined slot format or signaling priority, wherein the fourth BWP is designated as the BWP the UE will switch to when the third BWP is deactivated.

Example 40: The method of any of examples 23 through 39, further comprising configuring a third BWP of the plurality of BWPs to be activated when the activated BWP is deactivated, and receiving data indicating one of the plurality of BWPs to be complementary to the third BWP, wherein the indicated one BWP is designated as the BWP the UE will switch to when the third BWP is deactivated.

Example 41: The method of any of examples 23 through 40, wherein transmitting the data indicating one of the plurality of BWPs to be complementary comprises transmitting data via one of downlink control information (DCI), MAC control element (MAC-CE) or radio resource control (RRC) transmission.

Example 42: A scheduling entity in a wireless communication network, comprising: a wireless transceiver; a memory; and a processor communicatively coupled to the wireless transceiver and the memory, wherein the processor and the memory are configured to perform a method of any of the examples 23 through 41.

Example 43: An apparatus configured for wireless communication comprising means for performing a method of any one of examples 23 through 41.

Example 44: A non-transitory computer-readable medium having stored therein instructions executable by one or more processors of a wireless communication device in a wireless communication network to perform a method of any one of examples 23 through 41.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Likewise, a phrase referring to "a and/or b" is intended to cover: a; b; and a and b. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) in a wireless communication network, comprising:

one or more memories; and one or more processors communicatively coupled to one or more memories, wherein the one or more processors and the one or more memories are configured to:

communicate with a base station to configure an active anchor bandwidth part (BWP) of a plurality of BWPs of a carrier bandwidth for the UE, wherein the active anchor BWP is configured to be for a first full-duplex (FD) slot with a first uplink (UL) band;

select a complementary BWP of the plurality of BWPs to be an active BWP, based on slot format, wherein the complementary BWP is configured for a second FD slot with a second UL band, the first UL band being smaller than the second UL band; and activate the complementary BWP in response to deactivation of the active anchor BWP.

2. The UE of claim 1, wherein the complementary BWP has at least a partially overlapping bandwidth with the active anchor BWP.

3. The UE of claim 1, wherein the complementary BWP comprises a different sub-carrier spacing from the active anchor BWP.

4. A method of full duplex (FD) communication in a user equipment (UE), comprising:

communicating with a base station to configure an active anchor bandwidth part (BWP) of a plurality of BWPs of a carrier bandwidth for the UE, wherein the active anchor BWP is configured to be for a first full-duplex (FD) slot with a first uplink (UL) band;

selecting a complementary BWP of the plurality of BWPs to be an active BWP, based on slot format, wherein the complementary BWP is configured for a second FD slot with a second UL band, the first UL band being smaller than the second UL band; and activating the complementary BWP in response to deactivation of the active anchor BWP.

5. The method of claim 4, wherein the complementary BWP has at least a partially overlapping bandwidth with the active anchor BWP.

6. The method of claim 4, wherein the complementary BWP comprises a different sub-carrier spacing from the active anchor BWP.

* * * * *